US009836620B2

(12) United States Patent
Jin

(10) Patent No.: US 9,836,620 B2
(45) Date of Patent: Dec. 5, 2017

(54) COMPUTING SYSTEM FOR PRIVACY-AWARE SHARING MANAGEMENT AND METHOD OF OPERATION THEREOF

(71) Applicant: Samsung Electronics Co., Ltd., Suwon-si, Gyeonggi-do (KR)

(72) Inventor: Hongxia Jin, San Jose, CA (US)

(73) Assignee: Samsung Electronic Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/585,985

(22) Filed: Dec. 30, 2014

(65) Prior Publication Data

US 2016/0188902 A1    Jun. 30, 2016

(51) Int. Cl.
*G06F 21/62* (2013.01)
*H04W 12/02* (2009.01)
*H04W 4/02* (2009.01)
*G06Q 50/00* (2012.01)
*H04L 29/08* (2006.01)
*G06F 21/57* (2013.01)

(52) U.S. Cl.
CPC ........ *G06F 21/6245* (2013.01); *G06F 21/577* (2013.01); *G06Q 50/01* (2013.01); *H04L 67/306* (2013.01); *H04W 4/021* (2013.01); *H04W 12/02* (2013.01); *G06F 2221/034* (2013.01)

(58) Field of Classification Search
CPC ............... G06F 21/6245; G06F 21/577; G06F 2221/034; H04W 12/02; H04W 4/021; G06Q 50/01; H04L 67/306; H04L 67/10
USPC ..................................................... 726/27, 28
See application file for complete search history.

(56) References Cited

U.S. PATENT DOCUMENTS

| 5,555,376 | A | 9/1996 | Theimer et al. |
| 5,603,054 | A | 2/1997 | Theimer et al. |
| 5,611,050 | A | 3/1997 | Theimer et al. |
| 5,717,955 | A | 2/1998 | Swinehart |
| 6,571,279 | B1 | 5/2003 | Herz et al. |
| 8,156,206 | B2 | 4/2012 | Kiley et al. |
| 8,700,729 | B2 | 4/2014 | Dua |
| 2007/0022442 | A1 | 1/2007 | Gil et al. |
| 2007/0066364 | A1 | 3/2007 | Gil et al. |
| 2008/0133336 | A1* | 6/2008 | Altman .............. G06Q 30/0207 455/456.1 |
| 2008/0288330 | A1* | 11/2008 | Hildebrand ............ G06Q 10/06 705/7.28 |
| 2009/0065578 | A1 | 3/2009 | Peterson et al. |
| 2009/0328222 | A1 | 12/2009 | Helman et al. |

(Continued)

FOREIGN PATENT DOCUMENTS

WO    2005064854 A1    7/2005

*Primary Examiner* — Amir Mehramanesh
*Assistant Examiner* — Sakinah Taylor
(74) *Attorney, Agent, or Firm* — IP Investment Law Group

(57) ABSTRACT

A computing system includes a control unit configured to determine a usage context including a capability of a device, a usage time and a device location associated with the device, and a user context of one or more users with access to the device; analyze a privacy risk level of a resource based on a resource content included in the resource, a metadata concerning the resource, a collective input regarding the resource, and the usage context; and generate one or more options for sharing the resource with the device based on the privacy risk level and the usage context.

24 Claims, 9 Drawing Sheets

(56) References Cited

U.S. PATENT DOCUMENTS

| | | | |
|---|---|---|---|
| 2010/0134275 A1* | 6/2010 | Fitzgerald | G06F 21/88 |
| | | | 340/539.13 |
| 2010/0257577 A1 | 10/2010 | Grandison et al. | |
| 2012/0054841 A1* | 3/2012 | Schultz | G06F 21/44 |
| | | | 726/6 |
| 2012/0185910 A1* | 7/2012 | Miettinen | G06F 21/31 |
| | | | 726/1 |
| 2012/0331567 A1 | 12/2012 | Shelton | |
| 2013/0073473 A1 | 3/2013 | Heath | |
| 2013/0239220 A1 | 9/2013 | Gjonej et al. | |
| 2013/0246397 A1* | 9/2013 | Farver | G06F 17/30554 |
| | | | 707/722 |
| 2013/0325935 A1 | 12/2013 | Kiley et al. | |
| 2014/0032310 A1 | 1/2014 | Corrie et al. | |
| 2014/0108333 A1 | 4/2014 | Jain et al. | |
| 2014/0108486 A1* | 4/2014 | Borzycki | G06F 21/6218 |
| | | | 709/201 |
| 2014/0172724 A1 | 6/2014 | Dua | |
| 2014/0358632 A1* | 12/2014 | Graff | H04L 12/6418 |
| | | | 705/7.29 |
| 2015/0245189 A1* | 8/2015 | Nalluri | G06Q 50/265 |
| | | | 455/404.1 |

\* cited by examiner

COMPUTING SYSTEM FOR PRIVACY-AWARE SHARING MANAGEMENT AND METHOD OF OPERATION THEREOF

TECHNICAL FIELD

An embodiment of the present invention relates generally to a computing system, and more particularly to a system for privacy-aware sharing management.

BACKGROUND

Modern portable client and industrial electronics, especially client devices such as electronic watches, wristbands, health monitors, smartphones, tablets, and combination devices are providing increasing levels of functionality to support modem life including facilitating interactions with other electronic devices and appliances. Research and development in the existing technologies can take a myriad of different directions.

As users become more empowered with the growth of portable devices, new and old paradigms begin to take advantage of this new device space. There are many technological solutions to take advantage of this new device capability to communicate with other devices. However, users are often unsure how much of their sensitive or private data or information is being shared between such devices.

Thus, a need still remains for a computing system for privacy-aware sharing management appropriate for sharing information. In view of the ever-increasing commercial competitive pressures, along with growing client expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides a computing system including a control unit configured to determine a usage context including a capability of a device, a usage time and a device location associated with the device, and a user context of one or more users with access to the device; analyze a privacy risk level of a resource based on a resource content included in the resource, a metadata concerning the resource, a collective input regarding the resource, and the usage context; and generate one or more options for sharing the resource with the device based on the privacy risk level and the usage context.

An embodiment of the present invention provides a method of operation of a computing system including determining, with a control unit, a usage context including a capability of a device, a usage time and a device location associated with the device, and a user context of one or more users with access to the device; analyzing a privacy risk level of a resource based on a resource content included in the resource, a metadata concerning the resource, a collective input regarding the resource, and the usage context; and generating one or more options for sharing the resource with the device based on the privacy risk level and the usage context.

An embodiment of the present invention provides a non-transitory computer readable medium including determining a usage context including a capability of a device, a usage time and a device location associated with the device, and a user context of one or more users with access to the device; analyzing a privacy risk level of a resource based on a resource content included in the resource, a metadata concerning the resource, a collective input regarding the resource, and the usage context; and generating one or more options for sharing the resource with the device based on the privacy risk level and the usage context.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
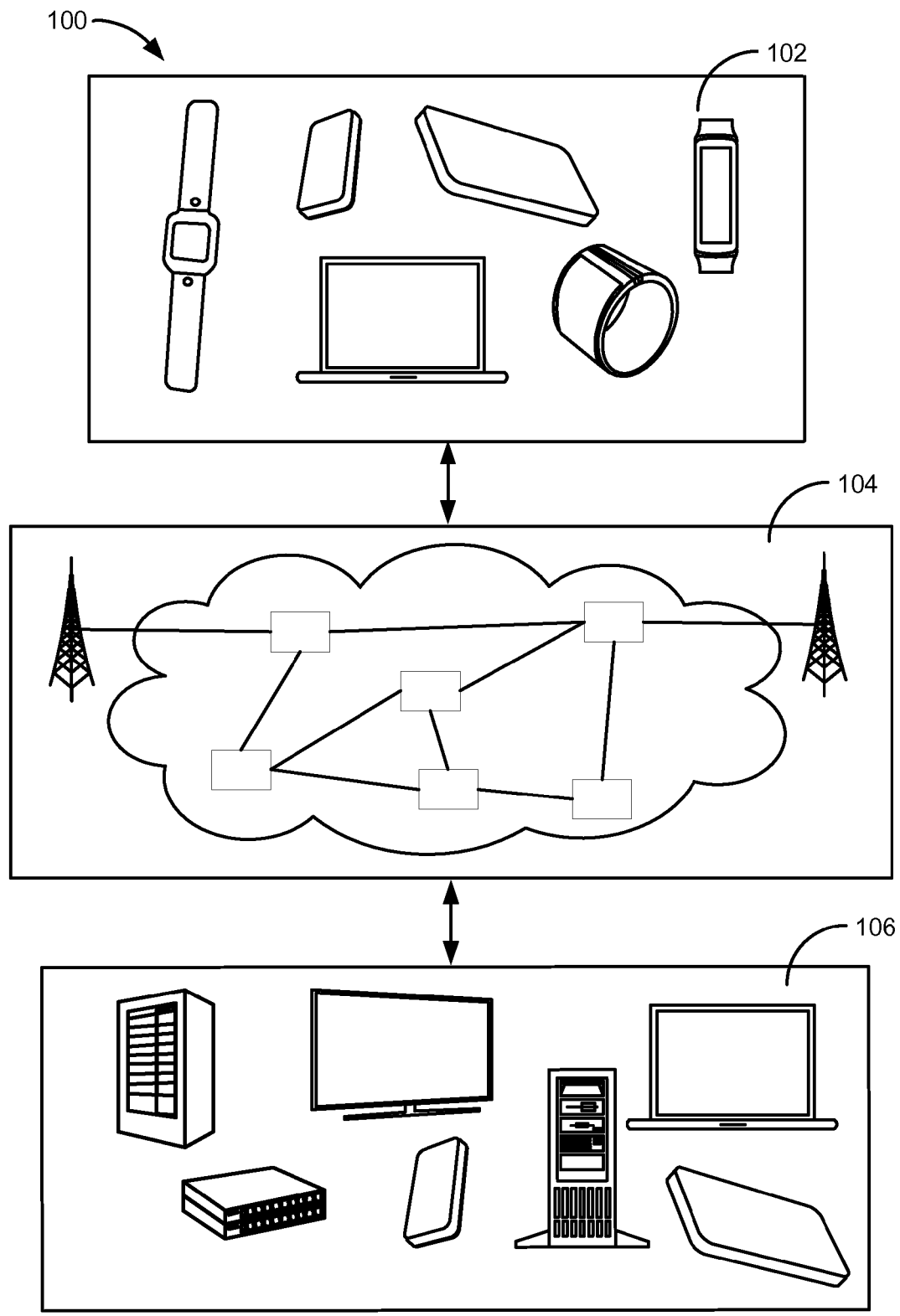
FIG. 1 is a computing system for a privacy-aware sharing management in an embodiment of the present invention.

Embodiments of the present invention provide a computing system configured to determine a usage context including a capability of a device, a usage time and a device location associated with the device, and a user context of one or more users with access to the device; analyze a privacy risk level of a resource based on a resource content included in the resource, a metadata concerning the resource, a collective input regarding the resource, and the usage context; and generate one or more options for sharing the resource with the device based on the privacy risk level and the usage context Embodiments of the present invention also provide a more accurate determination of the privacy risk of the resource. As an example, an image file of the user such as a digital photograph from a private album of the user can pose little risk when the location context is the home location of the user and the user context is only the user and close friends. However, the same instance of the image file of the user can post a great amount of risk when the location context is the work location and the user context can include work colleagues of the user.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 for a privacy-aware sharing management in an embodiment of the present invention. The computing system 100 includes a first device 102, such as a client device, connected to a second device 106, such as a client device or server. The first device 102 can communicate with the second device 106 with a communication path 104, such as a wireless or wired network.

For example, the first device 102 can be any of a variety of devices, such as a smartphone, a cellular phone, a tablet computer, a notebook computer, or other multi-functional displays or entertainment devices. The first device 102 can also be any of a variety of wearable devices, such as a watch, a health monitor, a fitness band, an electronic bracelet, a head-mounted device, a remote device, an electronic accessory, or a combination thereof. The first device 102 can be a standalone device or can be incorporated with a mobile device, an entertainment device, an article of clothing, an accessory, an adhesive device, a multi-functional device, or a combination thereof. The first device 102 can couple to the communication path 104 to communicate with the second device 106.

The second device 106 can be a mobile device or a non-mobile device. For example, the second device 106 can be any of a variety of mobile devices, such as a smartphone, a tablet device, a cellular phone, a wearable device, a notebook computer, a netbook computer, a thin client device, a multi-functional mobile communication or entertainment device, or a combination thereof.

The second device 106 can also be a non-mobile device such as a computing device, an appliance, an internet of things (IoT) device, or a combination thereof. The second device 106 can be any of a variety of centralized or decentralized computing devices. For example, the second device 106 can be a desktop computer, a grid computing resource, a server, a server farm, a virtualized computing resource, a cloud computing resource, a router, a switch, a peer-to-peer distributed computing resource, or a combination thereof.

The second device 106 can be centralized in a single computer room, distributed across different rooms, distributed across different geographical locations, or embedded within a telecommunications network. For example, the second device 106 can be a particularized machine, such as a mainframe, a server, a cluster server, a rack mounted server, or a blade server, or as more specific examples, an IBM System z10™ Business Class mainframe or a HP ProLiant ML™ server.

The second device 106 can also be an appliance including a living room appliance, a kitchen appliance, a bathroom appliance, a bedroom appliance, or a combination thereof. For example, the second device 106 can include a television, a video device, an audio device, a clock, a lighting unit, a home entertainment system, a washing machine, a refrigerator, an oven, a microwave, a gaming console, or a combination thereof. In addition, the second device 106 can include a thermostat, an alarm system, a heating unit, a cooling unit, an electronic door lock, a garage door opener, a power generation system, or a combination thereof. The second device 106 can have a means for coupling with the communication path 104 to communicate with the first device 102.

For illustrative purposes, the computing system 100 is described with the first device 102 as a portable multi-functional consumer device, although it is understood that the first device 102 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104.

For example, the first device 102, the second device 106, or a combination thereof can also function as part of the communication path 104. As a more specific example, the first device 102 can be a watch-type device and the second device 106 can be a server. In this example, the first device 102 can connect directly to the second device 106 through the communication path 104. As an additional example, the first device 102 representing the watch-type device can connect to the server through another instance of the second device 106 such as a smartphone, a notebook, a desktop computer, or a combination thereof.

The communication path 104 can be a variety of networks or communication mediums. For example, the communication path 104 can include wireless communication, wired communication, optical communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include a direct connection, personal area network (PAN), local area network (LAN), metropolitan area network (MAN), wide area network (WAN) or any combination thereof.

Figure 2:
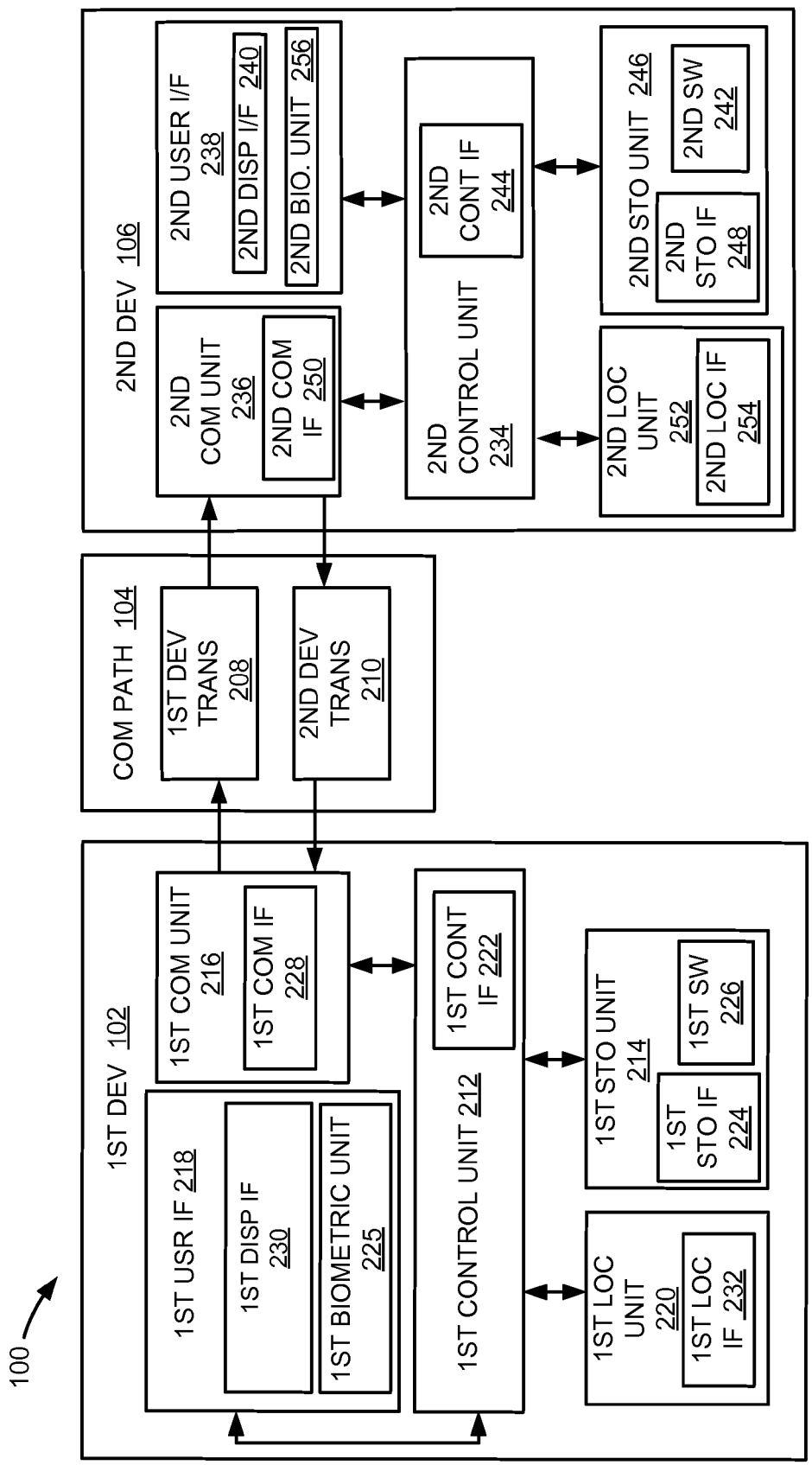
FIG. 2 is an example block diagram of the computing system.

Referring now to FIG. 2 therein is shown an exemplary block diagram of the computing system 100. The computing system 100 can include the first device 102, the communication path 104, and the second device 106. The first device 102 can send information in a first device transmission 208 over the communication path 104 to the second device 106.

The second device 106 can send information in a second device transmission 210 over the communication path 104 to the first device 102.

For illustrative purposes, the computing system 100 is shown with the first device 102 as a client device, although it is understood that the computing system 100 can have the first device 102 as a different type of device. For example, the first device 102 can be a relay device.

Also for illustrative purposes, the computing system 100 is shown with the second device 106 as a mobile device, a computing device, an appliance, or a combination thereof, although it is understood that the computing system 100 can have the second device 106 as a different type of device.

For brevity of description in this embodiment of the present invention, the first device 102 will be described as a client device and the second device 106 will be described as a mobile device, a computing device, an appliance, or a combination thereof. Embodiments of the present invention are not limited to this selection for the type of devices. The selection is an example of the embodiments of the present invention.

The first device 102 can include a first control unit 212, a first storage unit 214, a first communication unit 216, a first user interface 218, and a first location unit 220. The first control unit 212 can include a first control interface 222. The first control unit 212 can execute a first software 226 to provide the intelligence of the computing system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first location unit 220 can generate a location information, a heading, and a speed of the first device 102, as examples. The first location unit 220 can be implemented in many ways. For example, the first location unit 220 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The first location unit 220 can include a first location interface 232. The first location interface 232 can be used for communication between the first location unit 220 and other functional units in the first device 102. The first location interface 232 can also be used for communication that is external to the first device 102.

The first location interface 232 can receive information from the other functional units or from external sources, or can transmit information to the other functional units or to external destinations. The external sources and the external destinations refer to sources and destinations external to the first device 102.

The first location interface 232 can include different implementations depending on which functional units or external units are being interfaced with the first location unit 220. The first location interface 232 can be implemented with technologies and techniques similar to the implementation of the first control interface 222.

The first storage unit 214 can store the first software 226. The first storage unit 214 can also store relevant information, such as advertisements, biometric information, points of interest (POIs), navigation routing entries, reviews/ratings, feedback, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a notebook computer, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216.

The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a first biometric unit 225, or any combination thereof to provide data and communication inputs.

The first biometric unit 225 is configured to identify a user of the first device 102 through a biometric marker including a fingerprint, a heart rate, or a combination thereof. For example, the first biometric unit 225 can identify a user of the first device 102 by comparing the fingerprint of the user obtained using a component of the first biometric unit 225 against a stored instance of the fingerprint. In addition, the first biometric unit 225 can identify a user of the first device 102 by comparing a heart rate of the user obtained using a component of the first biometric unit 225 against a stored instance of the heart rate.

The first biometric unit 225 can be implemented in a number of ways. For example, the first biometric unit 225 can include a fingerprint scanner, a heart rate monitor, or a combination thereof. As a more specific example, the first biometric unit 225 representing the fingerprint scanner can be implemented as a capacitive fingerprint scanner, an optical fingerprint scanner including an infrared fingerprint scanner, or a combination thereof. In addition, the first biometric unit 225 representing the heart rate monitor can be implemented as an optical heart rate monitor, a capacitive heart rate monitor, a conductive heart rate monitor, or a combination thereof.

For illustrative purposes, the first biometric unit 225 is shown as separate from the first display interface 230, however, it should be understood that the first biometric unit 225 can encompass any number of components of the first user interface 218 including image capture units, a portion of the first display interface 230, capacitive surfaces, resistive surfaces, or a combination thereof. In addition, while the first biometric unit 225 is shown as being embedded in the first device 102, it should be understood that the first biometric unit 225 can operate on the periphery or outside of the first device 102.

The first user interface 218 can include a first display interface 230. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100, including receiving location information from the first location unit 220. The first control unit 212 can further execute the first software 226 for interaction with the communication path 104 via the first communication unit 216.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, a second user interface 238, and a second location unit 252.

The second user interface 238 allows the user to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second user interface 238 can also include a second biometric unit 256. The second biometric unit 256 is configured to identify a user of the second device 106 through a biometric marker including a fingerprint, a heart rate, or a combination thereof. For example, the second biometric unit 256 can identify a user of the second device 106 by comparing the fingerprint of the user obtained using a component of the second biometric unit 256 against a stored instance of the fingerprint. In addition, the second biometric unit 256 can identify a user of the second device 106 by comparing a heart rate of the user obtained using a component of the second biometric unit 256 against a stored instance of the heart rate.

The second biometric unit 256 can be implemented in a number of ways. For example, the second biometric unit 256 can include a fingerprint scanner, a heart rate monitor, or a combination thereof. As a more specific example, the second biometric unit 256 representing the fingerprint scanner can be implemented as a capacitive fingerprint scanner, an optical fingerprint scanner including an infrared fingerprint scanner, or a combination thereof. In addition, the second biometric unit 256 representing the heart rate monitor can be implemented as an optical heart rate monitor, a capacitive heart rate monitor, a conductive heart rate monitor, or a combination thereof.

For illustrative purposes, the second biometric unit 256 is shown as separate from the second display interface 240, however, it should be understood that the second biometric unit 256 can encompass any number of components of the second user interface 238 including image capture units, a portion of the second display interface 240, capacitive surfaces, resistive surfaces, or a combination thereof. In addition, while the second biometric unit 256 is shown as being embedded in the second device 106, it should be understood that the second biometric unit 256 can operate on the periphery or outside of the second device 106.

The second location unit 252 can generate a location information, a heading, and a speed of the second device 106, as examples. The second location unit 252 can be implemented in many ways. For example, the second location unit 252 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The second location unit 252 can include a second location interface 254. The second location interface 254 can be used for communication between the second location unit 252 and other functional units in the second device 106. The second location interface 254 can also be used for communication that is external to the second device 106.

The second location interface 254 can receive information from the other functional units or from external sources, or can transmit information to the other functional units or to external destinations. The external sources and the external destinations refer to sources and destinations external to the second device 106.

The second location interface 254 can include different implementations depending on which functional units or external units are being interfaced with the second location unit 252. The second location interface 254 can be implemented with technologies and techniques similar to the implementation of the second control interface 244.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the communication path 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, biometric information, points of interest, navigation routing entries, reviews/ratings, feedback, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second location unit 252 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The computing system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100. For example, the first device 102 is described to operate the first location unit 220, although it is understood that the second device 106 can also operate the first location unit 220. As an additional example, the second device 106 is described to operate the second location unit 252, although it is understood that the first device 102 can also operate the second location unit 252.

Figure 3:
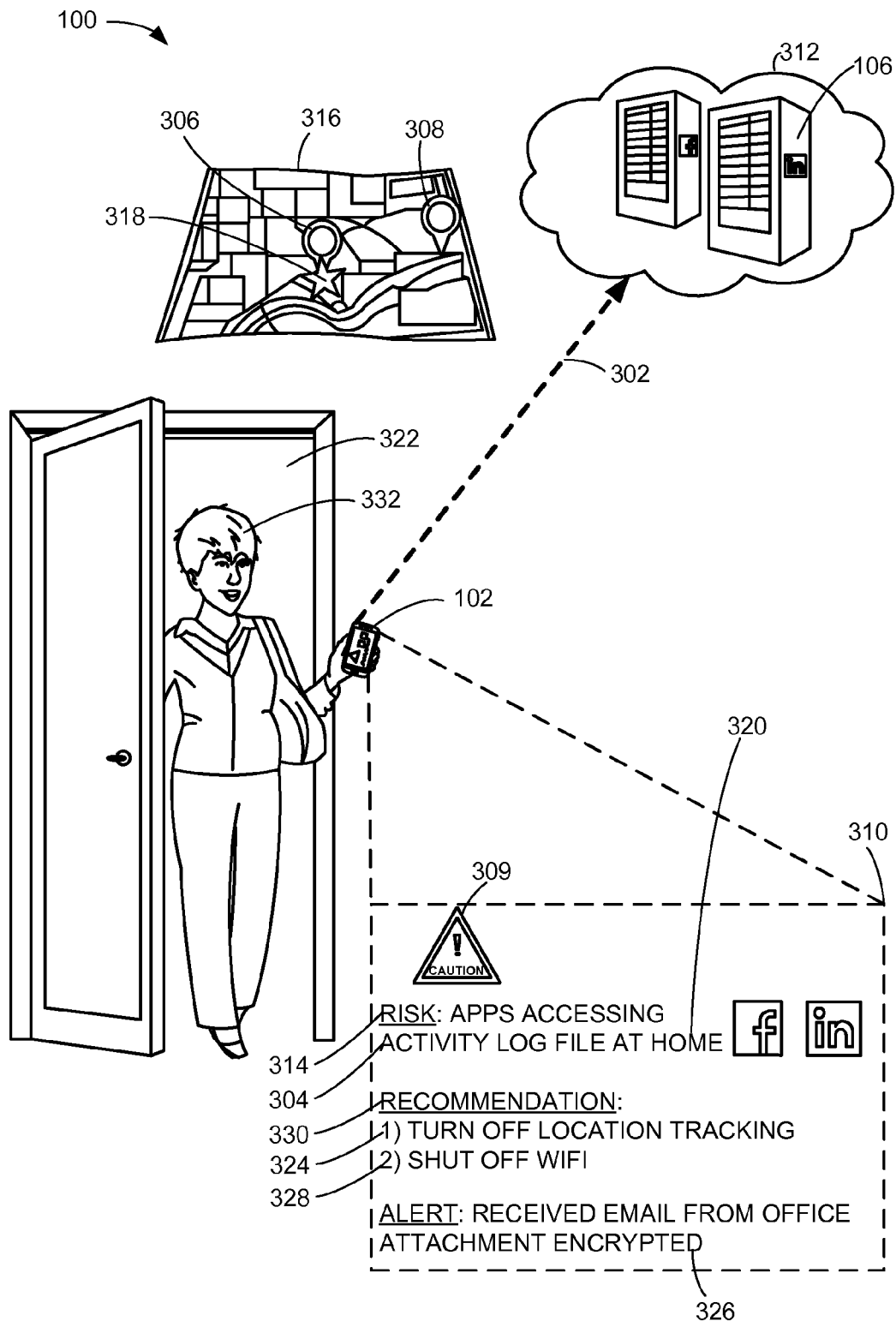
FIG. 3 is an example diagram of the computing system in operation.

Referring now to FIG. 3, therein is shown an example diagram of the computing system 100 in operation. The sharing operation 302 can involve a resource 304 presently accessed by a user or another device. The sharing operation 302 is a transfer of data or information from one device to another or a communication of data or information from a device to a user. As depicted in the example in FIG. 3, the sharing operation 302 can include a mobile client device representing the first device 102 communicating with an application server, such as a LinkedIn™ or Facebook™ server, representing the second device 106. In this example, the second device 106 can request access to an activity log representing the resource 304 stored on the first device 102.

As another example not shown in FIG. 3, the sharing operation 302 can include a tablet device representing the first device 102 sending a video file representing the resource 304 to a network-enabled television representing the second device 106. The resource 304 is a collection of data or information. As an example, the resource 304 can be maintained in a non-transitory computer readable medium. As another example, the resource 304 can include a text file, an image file, a video file, a log file, an executable file, an object file, or a combination thereof presently accessed by a user or another device.

As yet another example, the sharing operation 302 can include a device, such as the first device 102, sharing a video file representing the resource 304 with one or more users or companions of the user. In this example, the sharing operation 302 can involve only a singular device and the computing system 100 can determine whether one or more users can access the resource 304 on the singular device such as the first device 102.

As an example, the sharing operation 302 can involve the first device 102 as a source 306 of the sharing operation 302 and the second device 106 as a destination 308 of the sharing operation 302. The source 306 is a node in the communication path 104 of FIG. 1 where the resource 304 is stored. The destination 308 is a node in the communication path 104 requesting access to the resource 304 or where the resource 304 is to be sent.

The computing system 100 can determine a usage context 309 including a first usage context 310 of the first device 102 and a second usage context 312 of the second device 106. The computing system 100 can determine the usage context 309 for determining a privacy risk 314 associated with the sharing operation 302. The first usage context 310 is a set of circumstances or conditions surrounding the use of the first device 102. As an example, the first usage context 310 can be a set of circumstances or conditions surround one or more users and devices at the source 306 when the resource 304 is stored on the first device 102.

The second usage context 312 is a set of circumstances or conditions surrounding the use of the second device 106. As an example, the second usage context 312 can be a set of circumstances or conditions surrounding the use of the second device 106 at the destination 308 when the second device 106 is requesting access to the resource 304.

The first usage context 310 can include a location context 316. The location context 316 is a set of circumstances or conditions concerning a geographic location or coordinate of devices involved in the sharing operation 302. The computing system 100 can determine the location context 316 based on a device location 318. The device location 318 is a geographic location or coordinate of a device, such as the first device 102, the second device 106, or a combination thereof, in the computing system 100.

The device location 318 can be at a number of locations including a home location 320 or a public location 322. The home location 320 is a geographic location or coordinate of a residence of the user 332. The public location 322 is a geographic location or coordinate of a location other than the home location 320.

The computing system 100 can determine the first usage context 310 and the second usage context 312 for determining the privacy risk 314. The privacy risk 314 is a threat posed by a sharing of personal or sensitive data or information.

As an example, the privacy risk 314 can include the user 332 unintentionally uploading a personal image to a server or storage unit accessible by the general public. As another example, the privacy risk 314 can include a device, such as the first device 102, communicating a location information or usage history to an application server without the approval of the user 332 of the device. As yet another example, the privacy risk 314 can also include an underage individual accessing a file or application intended for mature audiences.

The usage context 309 can also include a sharing intent and a sharing purpose. The sharing intent is an intention for sharing the resource 304 with a device or user at the destination 308. The sharing purpose is a purpose of a device or user at the destination 308 for requesting access to the resource 304.

As will be discussed in more detail below, the computing system 100 can generate one or more options 324 for sharing the resource 304 with the first device 102, the second device 106, or a combination thereof. The options 324 can include a security measure 326, a privacy recommendation 330, or a combination thereof. The security measure 326 is a protective command or setting for managing the privacy risk 314. The security measure 326 can include a hardware setting or a software instruction for managing the privacy risk 314.

The security measure 326 can include a deactivation procedure 328. The deactivation procedure 328 is a command or setting for disabling or deactivating a hardware component of a device such as the first device 102, the second device 106, or a combination thereof. As an example, the deactivation procedure 328 can include a function call for deactivating a communication unit such as a WiFi component.

The privacy recommendation 330 is a choice or preference presented to the user 332 by the computing system 100 for managing the privacy risk 314. As an example, the privacy recommendation 330 can include a popup window suggesting the user 332 deploy one or more instances of the security measure 326.

Figure 4:
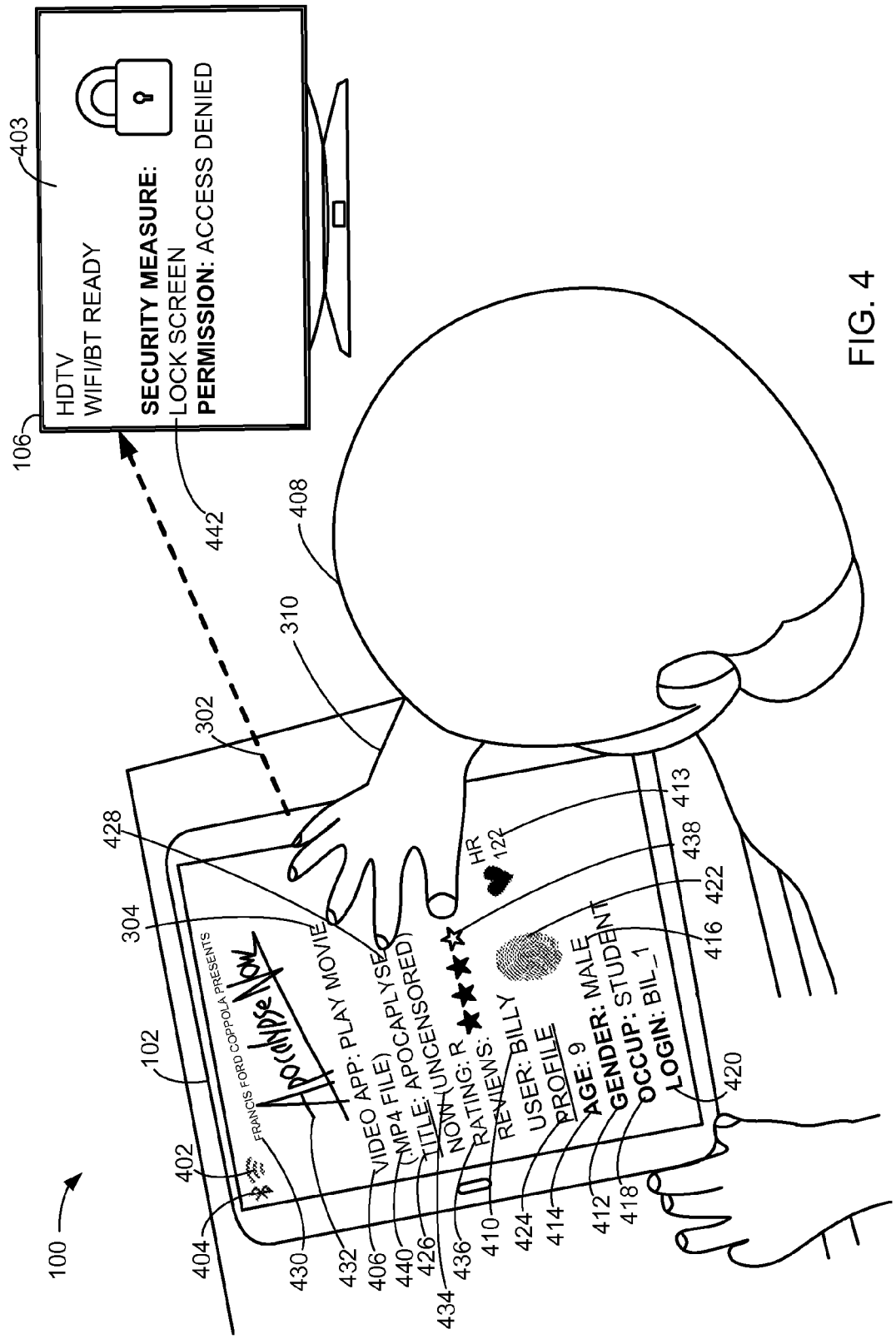
FIG. 4 is another example diagram of the computing system in operation.

Referring now to FIG. 4, therein is shown another example diagram of the computing system 100 in operation. FIG. 4 depicts a sharing operation 302 between a tablet device representing the first device 102 and a network-enabled television representing the second device 106. The computing system 100 can determine the first usage context 310 by determining a device context 402 and a user context 408.

The device context 402 is a circumstance or condition concerning a device in the computing system 100. The device context 402 can include a capability 403 of a device including a hardware capability 404, a software capability 406, or a combination thereof. The device context 402 can also include an environmental signal surrounding a device such as a level of ambient light or ambient noise in the vicinity of the device.

The hardware capability 404 is a presence or a functionality of a hardware component of a device such as the first device 102, the second device 106, or a combination thereof. The hardware capability 404 can include a communication functionality, a size of a display interface, a processing speed, or a combination thereof. The software capability 406 is a presence or a functionality of a software component of a device such as the first software 226 of FIG. 2, the second software 242 of FIG. 2, or a combination thereof.

The user context 408 is a circumstance or condition concerning the user 332 or another individual in a vicinity of a device such as the first device 102, the second device 106, or a combination thereof. The user context 408 can include a user identity 410, a user demographic 412, a mood 413, or a combination thereof. The user demographic 412 is a characteristic or attribute of the user 332. The user demographic 412 can include an age 414, a gender 416, an occupation 418, or a combination thereof of the user 332.

The computing system 100 can determine the user identity 410 based on a user credential 420, a biometric signature 422, or a combination thereof. The user identity 410 is a name or identifying label associated with the user 332. The user credential 420 is an input or digital certificate providing verification of the user identity 410. As an example, the user credential 420 can include a login name, a password, or a cryptographic key.

The biometric signature 422 is a physiological attribute of the user 332 which can be used to identify the user 332. As an example, the biometric signature 422 can include a fingerprint, a heart rate, a skin temperature, a facial feature, a voice feature, an ocular feature, or a combination thereof.

The mood 413 is an emotion or mood of the user 332 or another person in the vicinity of the user 332. The mood 413 can include a relaxed mood, an agitated or angry mood, a euphoric or happy mood, or a combination thereof. The computing system 100 can determine the mood 413 based on the biometric signature 422 including a heart rate, a skin temperature, a facial expression, an eye movement, or a combination thereof. The computing system 100 can use the first biometric unit 225 of FIG. 2, the second biometric unit 256 of FIG. 2, or a combination thereof to determine the mood 413.

The computing system 100 can determine the user demographic 412 based on a user profile 424. The user profile 424 is an electronic record concerning the user 332. The user profile 424 can be established when the user 332 accesses an application, a network, a device, or a combination thereof. The user profile 424 can be stored in the first storage unit 214, the second storage unit 246, or a combination thereof.

The computing system 100 can analyze the privacy risk 314 of FIG. 3 by analyzing a resource content 426. The resource content 426 is data or information concerning or included in the resource 304. The resource content 426 can include a substantive content 428, an ancillary content 434, a content attribute 440, or a combination thereof.

The substantive content 428 is a subject of the resource 304. The substantive content 428 can include a textual content 430, a pictorial content 432, or a combination thereof. As an example, the substantive content 428 can be words or characters included in a text document. As another example, the substantive content 428 can be a pixel image included in a digital photograph.

The ancillary content 434 is data or information concerning the resource 304. As an example, the ancillary content 434 can include a metadata 436 concerning the resource 304. As additional examples, the ancillary content 434 can also include a metadata 436 concerning an intended audience, an age restriction, or a combination thereof. As another example, the ancillary content 434 can include a collective input 438 regarding the resource 304. The collective input 438 can include a user review, a user comment, a user image, or a combination thereof compiled by the computing system 100 from one or more sources.

The content attribute 440 is a characteristic of the resource 304 concerning the generation or execution of the resource 304. As an example, the content attribute 440 can include a file type, a file version, a file creation time, or a combination thereof.

As an example, the resource 304 can be an application such as a navigation application or a discount shopping application. In this example, the resource content 426 can include a library file, a log file, a transaction file, or a combination thereof associated with the application. The ancillary content 434 can include a user review or the collective input 438 surrounding the use of the application. Also, in this example, the content attribute 440 can include a file version of the application, a developer of the application, or a combination thereof.

As depicted in FIG. 4, the computing system 100 can also generate a locking procedure 442 as the security measure 326 of FIG. 3. The locking procedure 442 is a command or setting for preventing the user 332 from accessing a hardware or software component of a device such as the first device 102, the second device 106, or a combination thereof. As an example, the computing system 100 can deploy the locking procedure 442 by locking screen access to the first device 102.

Figure 5:
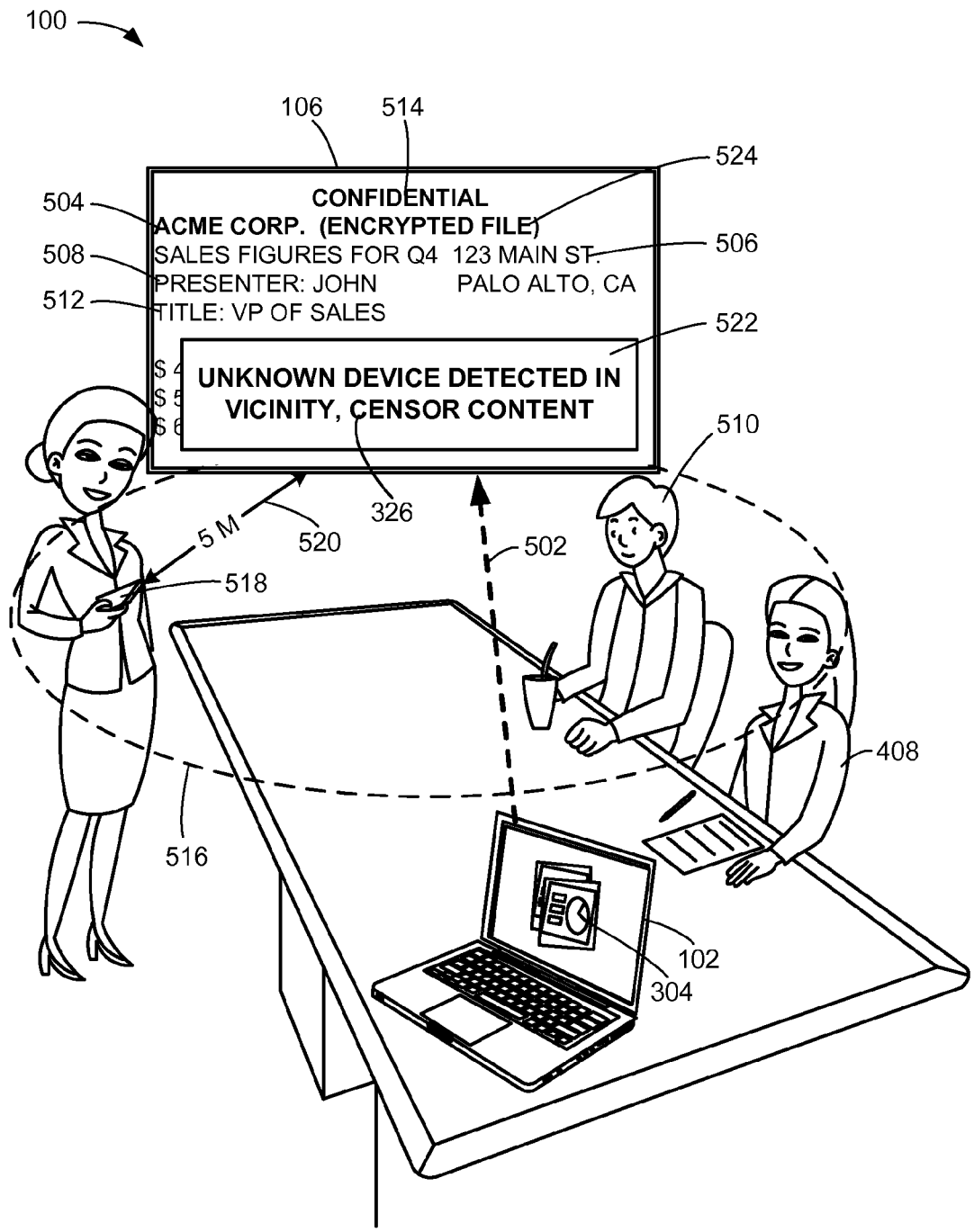
FIG. 5 is another example diagram of the computing system in operation.

Referring now to FIG. 5, therein is shown another example diagram of the computing system 100 in operation. FIG. 5 depicts an intra-enterprise sharing operation 502. The intra-enterprise sharing operation 502 is a transfer of data or information from one device to another within an enterprise 504. As depicted in FIG. 5, the intra-enterprise sharing operation 502 can involve the first device 102 sharing a slideshow file with a display device representing the second device 106. The first device 102 can share the slideshow file by mirroring the first display interface 230 of FIG. 2 on the second display interface 240 of FIG. 2.

The computing system 100 can determine the location context 316 of FIG. 3 of the intra-enterprise sharing operation 502 as a work location 506. The work location 506 is a geographic location or coordinate associated with an office or facility of the enterprise 504.

The computing system 100 can determine the user context 408 by taking into account a companion identity 508 and a companion demographic 512 of a companion 510. As an example, the companion 510 can include a colleague of the user 332 of FIG. 3. The companion identity 508 is a name or identifying label associated with the companion 510. The companion demographic 512 can include a characteristic or attribute of the companion 510.

The computing system 100 can analyze the privacy risk 314 of FIG. 3 based on a privacy trigger 514 included in the resource 304. The privacy trigger 514 is a word, phrase, graphic, or certificate signifying a confidentiality of the resource 304. As an example, the privacy trigger 514 can include the keywords "Confidential," "Private," or "Personal."

The computing system 100 can generate a privacy geo-fence 516 around the second device 106. The privacy geo-fence 516 is a virtual perimeter surrounding a geographic area or location in the real world. As an example, the privacy geo-fence 516 can surround the first device 102, the second device 106, or a combination thereof. The geometry of the privacy geo-fence 516 can include a circle, an ellipsoid, a polygon, or a combination thereof. The boundary of the privacy geo-fence 516 can be defined by an architectural boundary such as a wall of a room, an entry way, building façade, or a combination thereof. The size of the privacy geo-fence 516 can be defined by a distance segment, such as a radius, stemming from a reference point, such as a center point. For example, the reference point of the privacy geo-fence 516 can be the device location 318 of FIG. 3.

The computing system 100 can generate the privacy geo-fence 516 for detecting when a further device 518 is in a proximity 520 of the second device 106. The further device 518 is a device other than the first device 102 or the second device 106. As an example, the further device 518 can be carried by an individual not permitted to view or access the resource 304. Examples for the further device 518 can be the same examples as for the first device 102 and the second device 106.

The computing system 100 can generate a substitution procedure 522 as the security measure 326 when the further device 518 is detected within the privacy geo-fence 516. The substitution procedure 522 is an instance of the security measure 326 for obfuscating or replacing data or information included in the resource 304. As an example, the substitution procedure 522 can redact a portion of the substantive content 428 of the resource 304.

The first device 102 can also apply an encryption procedure 524 to the resource 304 when sharing the resource 304 during the intra-enterprise sharing operation 502. The encryption procedure 524 is a process of converting data into a secure form using a cipher or cryptography. As an example, the encryption procedure 524 can include a symmetric key encryption or a public key encryption.

Figure 6:
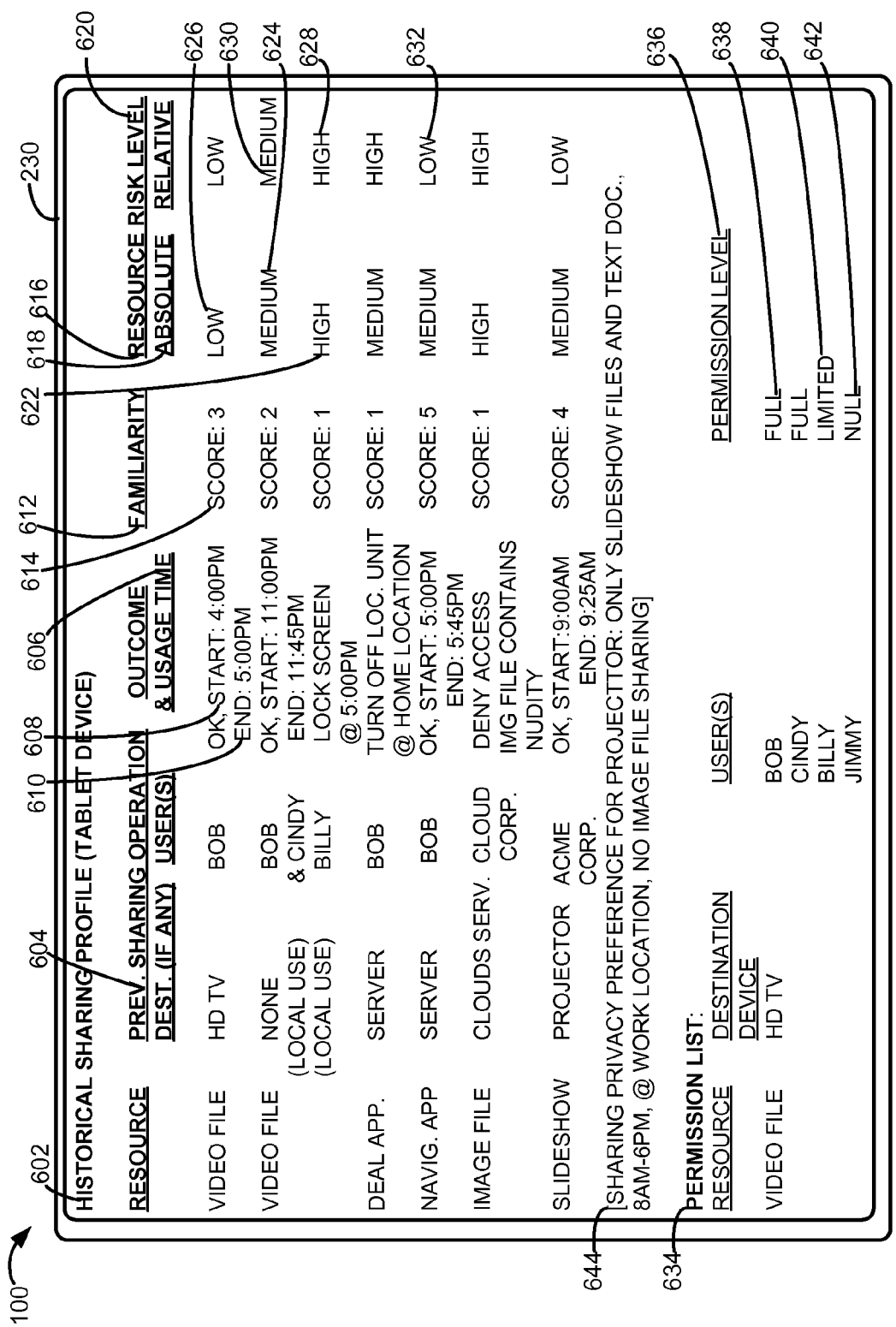
FIG. 6 is an example of a display on a display interface of the computing system.

Referring now to FIG. 6, therein is shown an example of a display interface of the computing system 100. The display interface can be the first display interface 230 of FIG. 2, the second display interface 240 of FIG. 2, or a combination thereof. The display interface can depict a historical sharing profile 602 with one or more instances of a previous sharing operation 604.

The previous sharing operation 604 is a past instance of the sharing operation 302 of FIG. 3. The historical sharing profile 602 is a record of one or more instances of the previous sharing operation 604. The historical sharing profile 602 can also include a usage time 606 of the previous sharing operation 604. The usage time 606 can include times marking a commencement 608 and a completion 610 of the previous sharing operation 604. As an example, the historical sharing profile 602 can include a record entry stating the commencement 608 of the previous sharing operation 604 between the first device 102 of FIG. 1 and the second device 106 of FIG. 1 at 4 PM and the completion 610 of the previous sharing operation 604 at 4:15 PM.

The computing system 100 can use the historical sharing profile 602 to generate a recommendation for the destination 308 of the sharing operation 302. As an example, a plurality of devices, such as the first device 102, the second device 106, the further device 518, or a combination thereof, can register with a device ecosystem provided by the computing system 100. The computing system 100 can recommend one or more devices registered with the device ecosystem as the destination 308 when the user 332 initiates the sharing operation 302 or selects the resource 304 for sharing. The computing system 100 also recommend a new device as the destination 308 based on the historical sharing profile 602.

The computing system 100 can also use the historical sharing profile 602 to determine a sharing familiarity 612. The sharing familiarity 612 is a degree to which conditions or circumstances surrounding the sharing operation 302 match conditions or circumstances surrounding one or more instances of the previous sharing operation 604. The computing system 100 can assign a familiarity score 614 to the sharing operation 302 based on the sharing familiarity 612. The familiarity score 614, in one embodiment, is a numerical value representing the degree to which conditions or circumstances surrounding the sharing operation 302 match conditions or circumstances surrounding the previous sharing operation 604.

As an example, the computing system 100 can assign the familiarity score 614 on a scale of 1 to 5. As a more specific example, the computing system 100 can assign the familiarity score 614 of "5" when the location context 316 of FIG. 3, the device context 402 of FIG. 4, and the user context 408 of FIG. 4 of the sharing operation 302 match the device context 402, the location context 316, and the user context 408, respectively, of one or more instances of the previous sharing operation 604 stored as part of the historical sharing profile 602.

The historical sharing profile 602 can also include a privacy risk level 616 of the resource 304 of FIG. 3 involved in the previous sharing operation 604. The privacy risk level 616 is a degree to which a privacy of the user 332 of FIG. 3 can be exposed or compromised by the sharing of the resource 304. The privacy risk level 616 can include an absolute risk level 618 and a relative risk level 620.

The absolute risk level 618 is an instance of the privacy risk level 616 determined based on the substantive content 428 of FIG. 4 of the resource 304. The relative risk level 620 is an instance of the privacy risk level 616 determined based on the substantive content 428 of the resource 304 and a context of the sharing operation 302. As an example, the computing system 100 can determine the absolute risk level 618 based on the pictorial content 432 of FIG. 4 of the resource 304. As another example, the computing system 100 can determine the relative risk level 620 based on the pictorial content 432 and the device location 318 of FIG. 3 of the first usage context 310 of FIG. 3.

In one embodiment, the absolute risk level 618 can include an absolute high risk 622, an absolute medium risk 624, or an absolute low risk 626. The absolute high risk 622 is a high likelihood of the privacy of the user 332 being exposed or comprised by the sharing of the resource 304. The absolute medium risk 624 is an intermediate likelihood of the privacy of the user 332 being exposed or compromised by the sharing of the resource 304. The absolute low risk 626 is a low likelihood of the privacy of the user 332 being exposed or compromised by the sharing of the resource 304.

In one embodiment, the relative risk level 620 can include a relative high risk 628, a relative medium risk 630, or a relative low risk 632. The relative high risk 628 is a high likelihood of the privacy of the user 332 being exposed or comprised by the sharing of the resource 304 when taking into account a context of the sharing operation 302. The relative medium risk 630 is an intermediate likelihood of the privacy of the user 332 being exposed or compromised by the resource 304 when taking into account a context of the sharing operation 302. The relative low risk 632 is a low likelihood of the privacy of the user 332 being exposed or compromised by the sharing of the resource 304 when taking into account a context of the sharing operation 302.

As an example, the resource 304 can be a mobile application such as a navigation application or a discount shopping application. In this example, both the navigation application and the discount shopping application can request the device location 318 in order to use the application. The computing system 100 can determine the relative risk level 620 of using the application based on the usage context 309 of FIG. 3.

As a more specific example, the computing system 100 can determine the relative risk level 620 of using the navigation application as the relative low risk 632 when a user is using the navigation application in the public location 322 of FIG. 3 and in the home location 320 of FIG. 3. However, the computing system 100 can determine the relative risk level 620 of using the discount shopping application as the relative high risk 628 when the user is using the discount shopping application in the home location 320 and the relative low risk 632 when a user is using the discount shopping application in the public location 322. The computing system 100 can make this determination based on the privacy risk 314 of FIG. 3 associated with sharing a user's home location with shopping applications that may collect information concerning the user's home address for purposes of monetizing such information.

The first display interface 230 can also depict a permission list 634. The permission list 634 is a record of devices with authorization to access the resource 304. As an example, the permission list 634 can include an access control list (ACL) such as role-based access control (RBAC) list, a discretionary access control (DAC) list, an attribute based access control (ABAC) list, or a combination thereof.

In one embodiment, the permission list 634 can include a permission level 636. The permission level 636 is an extent to which a device can access the resource 304. The permission level 636 can include a full permission 638, a limited permission 640, and a null permission 642. The full permission 638 is an instance of the permission level 636 allowing a device to view, edit, delete, and share the resource 304. The limited permission 640 is an instance of the permission level 636 allowing a device limited access to the resource 304. As an example, the computing system 100 can provide the second device 106 the limited permission 640 to view the resource 304 but not edit or delete the resource 304.

The null permission 642 is an instance of the permission level 636 prohibiting a device from accessing the resource 304. As an example, a device with the null permission 642 is not allowed to view, edit, delete, or access the resource 304.

The historical sharing profile 602 can also include a sharing privacy preference 644. The historical sharing profile 602 can link the sharing privacy preference 644 with a particular instance of the usage context 309. As an example, the historical sharing profile 602 can link the sharing privacy preference 644 for an instance of the resource 304 with a particular instance of the device location 318 and the usage time 606.

Figure 7:
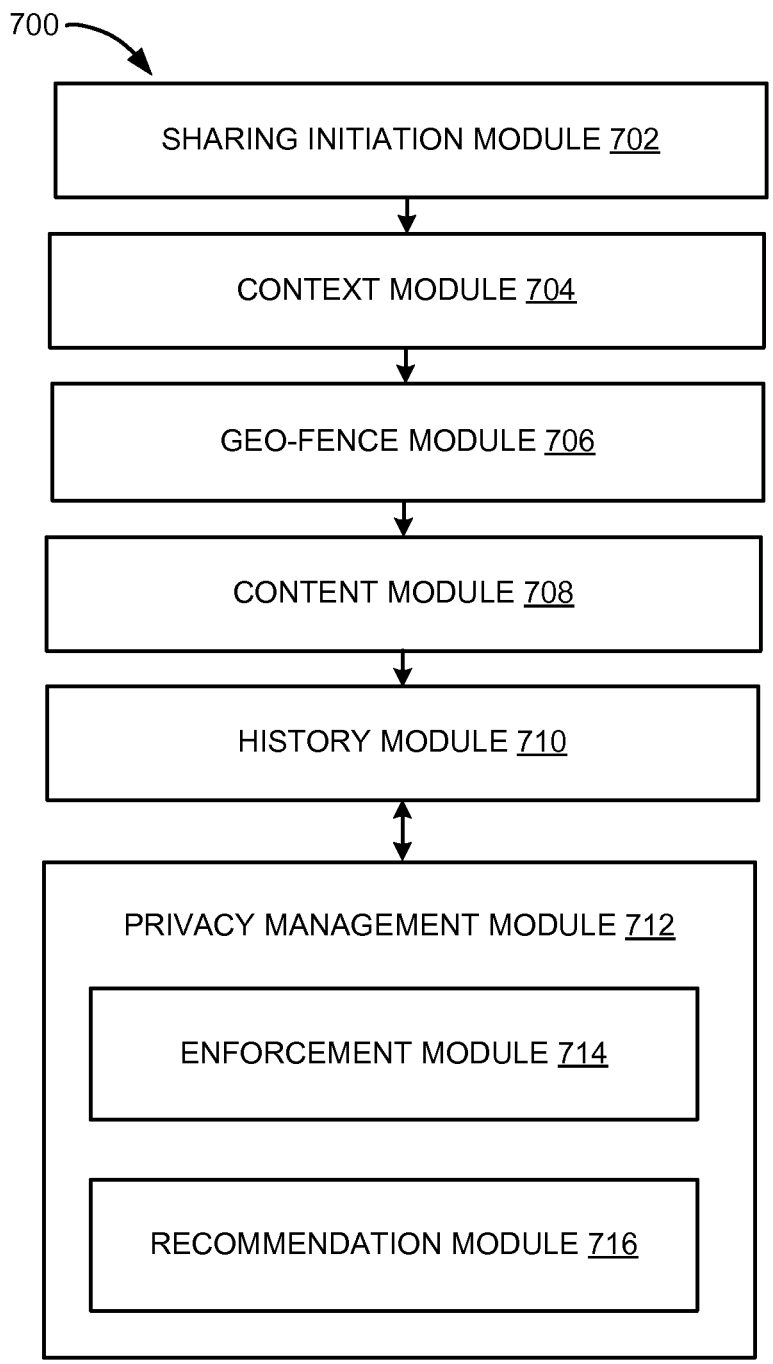
FIG. 7 is a control flow of the computing system.

Referring now to FIG. 7, therein is shown an exemplary control flow 700 of the computing system 100 of FIG. 1. The computing system 100 can include a sharing initiation module 702, a context module 704, a geo-fence module 706, a content module 708, a history module 710, a privacy management module 712, or a combination thereof.

The sharing initiation module 702 is configured to determine the commencement 608 of FIG. 6 of the sharing operation 302 of FIG. 3. The sharing initiation module 702 can determine the commencement 608 of the sharing operation 302 for managing the privacy risk 314 of FIG. 3 of the user 332 of FIG. 3. The sharing initiation module 702 can determine the commencement 608 of the sharing operation 302 in a number of ways.

As an example, the sharing initiation module 702 can determine the commencement 608 of the sharing operation 302 when a device in the computing system 100, such as the first device 102 of FIG. 1, selects the resource 304 of FIG. 3 to be shared with the second device 106 of FIG. 1 through the communication path 104 of FIG. 1.

As a more specific example, the first device 102 can select the resource 304 to be shared with the second device 106 by selecting the resource 304 to be sent to the second device 106 using an email protocol, a messaging protocol, a direct transfer protocol, an upload protocol, or a combination thereof. In this example, the source 306 of FIG. 306 of the sharing operation 302 can be the first device 102 and the destination 308 of FIG. 3 of the sharing operation 302 can be the second device 106.

As another specific example, the first device 102 can select the resource 304 to be shared with the second device 106 by selecting the resource 304 to be mirrored or projected on a display interface of the second device 106 such as the second display interface 240 of FIG. 2. As an even more specific example, the first device 102 can be a tablet computer and the second device 106 can be a network-enabled television. In this example, the sharing initiation module 702 can determine the commencement 608 of the sharing operation 302 when the tablet computer sends a digital movie to be played on the network-enabled television over a WiFi network.

As yet another more specific example, the first device 102 can select the resource 304 to be shared with the second device 106 by selecting the resource 304 to be uploaded to a cloud or distributed computing server through the communication path 104. As an even more specific example, the first device 102 can be a mobile client device and the second device 106 can be a Dropbox™ server. In this example, the sharing initiation module 702 can determine the commencement 608 of the sharing operation 302 when the mobile client device uploads an image file to Dropbox™.

The first device 102 can select the resource 304 to be shared with the second device 106 based on a user input. In addition, the first device 102 can select the resource 304 to be shared with the second device 106 automatically based on a device setting such as a backup storage setting or a network setting.

As another example, the sharing initiation module 702 can determine the commencement 608 of the sharing operation 302 when a device in the computing system 100, such as the first device 102, receives a request from another device to access the resource 304 stored in the first storage unit 214 of FIG. 2. As a more specific example, the first device 102 can be a laptop computer and the second device 106 can be an application server. In this example, the sharing initiation module 702 can determine the commencement 608 of the sharing operation 302 when the laptop computer receives a request from the application server to access a cookie file or web beacon representing the resource 304 stored in a memory of the laptop computer.

As another specific example, the first device 102 can be a mobile client device and the second device 106 can be a cloud server. In this example, the sharing initiation module 702 can determine the commencement 608 of the sharing operation 302 when the mobile client device receives a request from the cloud server to access an image file or video file representing the resource 304 stored in the first storage unit 214 of the first device 102.

The sharing initiation module 702 can also determine the commencement 608 of the sharing operation 302 by recording the usage time 606 of FIG. 6 of the sharing operation 302. The usage time 606 of the sharing operation 302 can include a time-of-day, a day-of-the-week, a calendar day, a month, a year, or a combination thereof concerning the commencement 608 of the sharing operation 302.

The sharing initiation module 702 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to determine the commencement 608 of the sharing operation 302.

Moreover, the sharing initiation module 702 can also communicate the commencement 608 of the sharing operation 302 between devices through the first communication unit 216 of FIG. 2, the second communication unit 236 of FIG. 2, or a combination thereof. After determining the commencement 608 of the sharing operation 302, the control flow 700 can pass from the sharing initiation module 702 to the context module 704.

The context module 704 is configured to determine the device context 402 of FIG. 4, the location context 316 of FIG. 3, the user context 408 of FIG. 4, or a combination thereof. The context module 704 can determine the device context 402, the location context 316, the user context 408, or a combination thereof for a device such as the first device 102 or the second device 106. As an example, the context module 704 can determine the first usage context 310 of FIG. 3. The first usage context 310 includes the device context 402, the location context 316, the user context 408, or a combination thereof of the first device 102.

As an additional example, the context module 704 can also determine the second usage context 312 of FIG. 3. The second usage context 312 includes the device context 402, the location context 316, the user context 408, or a combination thereof of the second device 106.

The context module 704 can also determine a sharing intent, a sharing purpose, or a combination thereof. As previously discussed, the sharing intent can be an intention of the user 332 at the source 306 for sharing the resource 304 with a device at the destination 308. In addition, the sharing purpose can be a purpose of a device or user at the destination 308 for requesting access to the resource 304.

The context module 704 can determine the sharing intent and the sharing purpose based on the capability 403 of devices at the source 306, the destination 308, or a combination thereof. As an example, the context module 704 can determine the sharing intent of transferring a video file from a tablet device to a network-enabled television as taking advantage of the larger screen size of the network-enabled television.

The context module 704 can also determine the sharing intent and the sharing purpose based on the user identity 410 and the user demographic 412. As an example, the context module 704 can determine the sharing intent of one user emailing an image file from a mobile device to a laptop of another user as information sharing between family members based on the user identity 410 and the user demographic 412 of the two users.

In addition, the context module 704 can determine the sharing intent and the sharing purpose based on the device location 318 and the resource content 426. As an example, the context module 704 can determine the sharing purpose of a navigation server requesting location information from a mobile device as the navigation server needing some location information to provide navigation instructions to a user of the mobile device.

The context module 704 will be discussed in greater detail below. The context module 704 can be part of the first software 226, the second software 242, or a combination thereof. The first control unit 212 can execute the first software 226, the second control unit 234 can execute the second software 242, or a combination thereof to determine the first usage context 310 and the second usage context 312 including the device context 402, the location context 316, the user context 408, or a combination thereof.

Moreover, the context module 704 can also communicate the first usage context 310 and the second usage context 312 including the device context 402, the location context 316, the user context 408, or a combination thereof between devices through the first communication unit 216, the second communication unit 236, or a combination thereof. After determining the first usage context 310 and the second usage context 312, the control flow 700 can pass from the context module 704 to the geo-fence module 706.

The geo-fence module 706 is configured to generate the privacy geo-fence 516 of FIG. 5. The geo-fence module 706 can generate the privacy geo-fence 516 around the first device 102, the second device 106, or a combination thereof. The geo-fence module 706 can generate the geo-fence 516 around a device based on a device identification number such as a serial number or a model number.

The geo-fence module 706 can also generate the geo-fence 516 around a device based on the user credential 420 of FIG. 4. As an example, the geo-fence module 706 can generate the geo-fence 516 around a device such as the first device 102, the second device 106, or a combination thereof when the user credential 420 is associated with a company or enterprise log-in. In addition, the geo-fence module 706 can generate the geo-fence 516 around a device based on an access authorization such as the permission level 636 to access an instance of the resource 304. As an example, the geo-fence module 706 can generate the geo-fence 516 around a device when the device is near or surrounded by one or more other devices with similar instances of the permission level 636 or similar access authorization.

The geo-fence module 706 can generate the privacy geo-fence 516 to determine the proximity 520 of FIG. 5 of one device to another device. As an example, the geo-fence module 706 can generate the privacy geo-fence 516 to determine the proximity 520 of the first device 102 to the second device 106. As another example, the geo-fence module 706 can generate the privacy geo-fence 516 to determine the proximity 520 of the further device 518 of FIG. 5 to either the first device 102 or the second device 106.

The geo-fence module 706 can generate the privacy geo-fence 516 with the center point of the privacy geo-fence 516 as the device location 318 of FIG. 3. The geo-fence module 706 can also increase or decrease a size of the privacy geo-fence 516 by increasing or decreasing a boundary of the privacy geo-fence 516. As an example, the geo-fence module 706 can generate the privacy geo-fence 516 by using the first communication unit 216, the second communication unit 236, or a combination thereof to transmit a beacon signal. The beacon signal can include a Bluetooth™ Low Energy (BLE) signal, a WiFi signal, an infrared signal, or a combination thereof.

In this example, the geo-fence module 706 can increase the boundary of the privacy geo-fence 516 by increasing a signal range of the beacon signal. The geo-fence module 706 can determine a device, such as the second device 106, is within the privacy geo-fence 516 of another device, such as the first device 102, when the second device 106 transmits a response to the beacon signal of the first device 102.

The geo-fence module 706 can determine the proximity 520 of one device to another device when the other device is detected within the privacy geo-fence 516. As an example, the geo-fence module 706 can generate the privacy geo-fence 516 as a virtual perimeter measuring 3 meters around the first device 102. In this example, the geo-fence module 706 can determine the proximity 520 of the second device 106 as within 3 meters of the first device 102 when the second device 106 is detected within the privacy geo-fence 516.

The geo-fence module 706 can be part of the first software 226, the second software 242, or a combination thereof. The first control unit 212 can execute the first software 226, the second control unit 234 can execute the second software 242, or a combination thereof to generate the privacy geo-fence 516.

Moreover, the context module 704 can also communicate the privacy geo-fence 516 between devices through the first communication unit 216, the second communication unit 236, or a combination thereof. After generating the privacy geo-fence 516, the control flow 700 can pass from the geo-fence module 706 to the content module 708.

The content module 708 is configured to analyze the privacy risk level 616 of FIG. 6 of the resource 304 presently accessed by the user 332, the companion 510 of FIG. 5, or one or more other devices. The content module 708 can analyze the privacy risk level 616 of the resource 304 by retrieving the resource 304 from a storage unit such as the first storage unit 214, the second storage unit 246, or a combination thereof. The content module 708 can use a storage interface to retrieve the resource 304. As an example, the content module 708 can use the first storage interface 224 of FIG. 2 to retrieve the resource 304.

The content module 708 can analyze the privacy risk level 616 of the resource 304 presently accessed by the user 332, the companion 510 of FIG. 5, or one or more other devices in a number of ways. The content module 708 can analyze the privacy risk level 616 based on the resource content 426 of FIG. 4 of the resource 304. The content module 708 can analyze the privacy risk level 616 by first analyzing the substantive content 428 of FIG. 4 of the resource 304. As previously discussed, the substantive content 428 can include the textual content 430 of FIG. 4, the pictorial content 432 of FIG. 4, or a combination thereof.

As an example, the content module 708 can analyze the textual content 430 of the resource 304 by applying a natural language parsing algorithm, a text mining algorithm, a named-entity recognition algorithm, or a combination thereof to the textual content 430 included in the resource 304. As another example, the content module 708 can analyze the textual content 430 by searching for one or more instances of the privacy trigger 514 of FIG. 5 in the textual content 430. As previously discussed, the privacy trigger 514 can include the words "Confidential," "Personal," "Secret," "Private," or a combination thereof.

As an additional example, the content module 708 can analyze the pictorial content 432 of the resource 304 by applying an image classification algorithm such as a deep learning algorithm, a deep neural network algorithm, a convolutional deep neural network algorithm, a deep believe network algorithm, or a combination thereof to the pictorial content 432 of the resource 304. As an example, the content module 708 can analyze the pictorial content 432 to extract text or characters from the pictorial content 432. As a more specific example, the content module 708 can extract sensitive data or information from the pictorial content 432 including time or location information.

As another example, the content module 708 can also analyze the pictorial content 432 for images of the user 332. As a more specific example, the content module 708 can also apply a facial-recognition algorithm to the pictorial content 432.

As another example, the content module 708 can apply an image recognition algorithm to determine whether the resource 304, including the pictorial content 432, contains an image or a video frame of a person in a state of undress. As a more specific example, the content module 708 can analyze the pictorial content 432 to determine whether the resource 304 contains a nude image of the user 332. As an example, the content module 708 can use a pixel segmentation technique to analyze the red-green-blue (RGB) values and the hue-saturation-value (HSV) values of the pictorial content 432 to determine whether the RGB values or the HSV values match values commonly associated with human skin tones. The content module 708 can then determine the resource 304, including the pictorial content 432, as depicting a nude or partially nude image of a person when the RGB values or the HSV values exceed a threshold value predetermined by the computing system 100.

The content module 708 can also analyze the privacy risk level 616 by analyzing the ancillary content 434 of FIG. 4 of the resource 304. As an example, the content module 708 can analyze the privacy risk level 616 by analyzing a metadata concerning the resource 304. As a more specific example, the content module 708 can analyze the ancillary content 434 by applying a natural language parsing algorithm, a text mining algorithm, a named-entity recognition algorithm, or a combination thereof to the ancillary content 434. As an even more specific example, the content module 708 can analyze the privacy risk level 616 by searching a file description representing the ancillary content 434 for the privacy trigger 514.

As another example, the content module 708 can analyze the privacy risk level 616 by analyzing the collective input 438 of FIG. 4 regarding the resource 304. The collective input 438 can include a user review, a user comment, a user image, a crowd-sourced content, or a combination thereof compiled by the computing system 100 from one or more sources. As a more specific example, the content module 708 can analyze the privacy risk level 616 by searching the collective input 438 for information concerning the intended audience, the age restriction, or a combination thereof of the resource 304.

As an example, the content module 708 can determine the intended audience for a movie file as a mature audience or those over 18 years of age. As another example, the intended audience can include a cohort group such as a work cohort or a familial cohort.

The content module 708 can also analyze the privacy risk level 616 by analyzing information from a content provider of the resource 304. As an example, the content provider can be a movie studio when the resource 304 is a movie file. In this example, the content module 708 can analyze the privacy risk level 616 by analyzing an audience rating of the movie file. As another example, the content provider can be a record label when the resource 304 is an audio file. In this example, the content module 708 can analyze the privacy risk level 616 by analyzing an audio censorship rating of the audio file.

The content module 708 can analyze the privacy risk level 616 by analyzing the content attribute 440 of FIG. 4 of the resource 304. The content attribute 440 can include a file type, a file version, a file creation time, or a combination thereof. As an example, the content module 708 can analyze the privacy risk level 616 by determining the file type of the resource 304 as an audio file in an MPEG Layer III (.mp3) file format.

As another example, the content module 708 can analyze the privacy risk level 616 by determining the file version of the resource 304 as a fourth version. As an additional example, the content module 708 can analyze the privacy risk level 616 by determining the file creation time of the resource 304 as a Saturday at 11 pm.

Once the content module 708 has analyzed the resource content 426 including the substantive content 428, the ancillary content 434, the content attribute 440, or a combination thereof, the content module 708 can analyze the privacy risk level 616 by assigning the absolute risk level 618 of FIG. 6 to the resource 304 based on the resource content 426. The content module 708 can assign the absolute risk level 618 of the resource 304 as the absolute high risk 622 of FIG. 6, the absolute medium risk 624 of FIG. 6, or the absolute low risk 626 of FIG. 6.

As an example, the content module 708 can analyze the textual content 430 of a slideshow file representing the resource 304 for the privacy trigger 514. In this example, the content module 708 can find numerous instances of the privacy trigger 514 in a text portion of the slideshow file. Based on this example, the content module 708 can assign the privacy risk level 616 of the absolute high risk 622 to the slideshow file.

As another example, the content module 708 can analyze the pictorial content 432 for images of the user 332. In this example, the content module 708 can find an instance of the user 332 in a state of undress in a digital photograph stored in the first device 102 representing the resource 304. Based on this example, the content module 708 can assign the privacy risk level 616 of the absolute high risk 622 to the digital photograph.

The content module 708 can also analyze the privacy risk level 616 of the resource 304 based on a rendering service of the resource 304. The rendering service can be an application or utility on a device for accessing, executing, or playing the resource 304. As an example, the rendering service can be a video player application, an audio player application, or a combination thereof.

As an additional example, the content module 708 can analyze the ancillary content 434 from a content provider of an audio file representing the resource 304. In this example, the content module 708 can analyze the metadata 436 of the audio file and the audio censorship rating of the audio file for the age restriction and the intended audience. The content module 708 can discover the audio file contains explicit lyrics with adult language. Based on this example, the content module 708 can assign the privacy risk level 616 of the absolute high risk 622 to the audio file.

As a further example, the content module 708 can analyze the content attribute 440 of an image file representing the resource 304. In this example, the content module 708 can determine the file creation time of the image file as 11:55 pm on a Saturday. Based on this example, the content module 708 can assign the privacy risk level 616 of the absolute medium risk 624 to the image file.

As yet another example, the content module 708 can analyze the content attribute 440 of a spreadsheet file representing the resource 304. In this example, the content module 708 can determine the file version of the spreadsheet file as a second version and the file creation time as 3 pm on a Tuesday. Based on this example, the content module 708 can assign the privacy risk level 616 of the absolute low risk 626 to the spreadsheet file.

The content module 708 can also analyze the privacy risk level 616 based on the first usage context 310, the second usage context 312, the resource content 426, or a combination thereof. The content module 708 can analyze the privacy risk level 616 based on the first usage context 310, the second usage context 312, and the resource content 426 by assigning the relative risk level 620 of FIG. 6 to the resource 304. The content module 708 can assign the relative risk level 620 of the resource 304 as the relative high risk 628 of FIG. 6, the relative medium risk 630 of FIG. 6, or the relative low risk 632 of FIG. 6.

As an example, the content module 708 can determine the relative risk level 620 based on the device location 318. As a more specific example, the sharing initiation module 702 and the context module 704 can determine the commencement 608 of the sharing operation 302 between a laptop representing the first device 102 and another laptop representing the second device 106 involving a slideshow file representing the resource 304.

In this example, the context module 704 can determine the device location 318 of the first device 102 as the work location 506 of FIG. 5 and the device location 318 of the second device 106 as the same instance of the work location 506. Continuing with this example, the content module 708 can find one instance of the privacy trigger 514 of "Confidential" in the slideshow file. Based on this example, the content module 708 can assign the relative risk level 620 of the relative low risk 632 to the slideshow file.

As another specific example, the resource 304 can be the same instance of the slideshow file in the example above and the sharing operation 302 can also be between the first device 102 and the second device 106. However, in this example, the context module 704 can determine the device location 318 of the second device 106 as at the public location 322 of FIG. 3. Based on this example, the content module 708 can assign the relative risk level 620 of the relative medium risk 630 to the slideshow file.

As another example, the content module 708 can determine the relative risk level 620 based on the user context 408. As a more specific example, the sharing initiation module 702 and the context module 704 can determine the commencement 608 of the sharing operation 302 between a tablet device representing the first device 102 and a network-enabled television representing the second device 106 involving a movie file representing the resource 304. In addition, the sharing initiation module 702 can determine the usage time 606 of the sharing operation 302 as 4 pm.

In this example, the context module 704 can also determine the second usage context 312 as involving the user 332 and a child under the age 414 of 10 representing the companion 510. Continuing with this example, the content module 708 can analyze the ancillary content 434 and determine the intended audience as for mature audiences. Based on this example, the content module 708 can assign the relative risk level 620 of the relative high risk 628 to the movie file.

As another specific example, the resource 304 can be the same instance of the movie file in the example above and the sharing operation 302 can also be between the first device 102 and the second device 106. However, in this example, the context module 704 can determine the second usage context 312 as involving just the user 332. In addition, the sharing initiation module 702 can determine the usage time 606 of the sharing operation 302 as the nighttime based on one or more environmental signals and the time-of-day. Based on this example, the content module 708 can assign the relative risk level 620 of the relative low risk 632 to the movie file.

As an additional example, the content module 708 can determine the relative risk level 620 based on the device context 402, the location context 316, and the user context 408. As a more specific example, the sharing initiation module 702 and the context module 704 can determine the commencement 608 of the sharing operation 302 between a smartphone representing the first device 102 and a projector representing the second device 106 involving an image file representing the resource 304. In addition, the sharing initiation module 702 can determine the usage time 606 of the sharing operation 302 as 11 am.

In this example, the context module 704 can determine the device location 318 of the first device 102 as the work location 506 and the device location 318 of the second device 106 as the same instance of the work location 506. Also in this example, the context module 704 can determine the first usage context 310 and the second usage context 312 as involving the user 332 of the first device 102 and multiple people representing the companion 510. Continuing with this example, the content module 708 can analyze the image file and determine the image file contains an image of the user 332. Based on this example, the content module 708 can assign the relative risk level 620 of the relative high risk 628 to the image file.

As another specific example, the resource 304 can be the same instance of the movie file and the sharing operation 302 can be between the first device 102 and a tablet device representing the second device 106. However, in this example, the context module 704 can determine the device location 318 of the second device 106 as the public location 322 based on location data from a GPS component of the second device 106 and the ambient noise level. In addition, the sharing initiation module 702 can determine the usage time 606 of the sharing operation 302 as 10 pm. Also in this example, the context module 704 can determine the second usage context 312 as involving the user 332 of the second device 106 and multiple people representing the companion 510. Based on this example, the content module 708 can assign the relative risk level 620 of the relative medium risk 630 to the image file.

As an additional example, the resource 304 can be a mobile application such as a navigation application or a discount shopping application. In this example, both the navigation application and the discount shopping application can request the device location 318 in order to use the application. The content module 708 can determine the relative risk level 620 of using the application based on the usage context 309. For example, the content module 708 can determine the relative risk level 620 of using the navigation application as the relative low risk 632 when a user is using the navigation application in either the public location 322 or the home location 320.

However, the content module 708 can determine the relative risk level 620 of using the discount shopping application as the relative low risk 632 when the user 332 is using the discount shopping application in the public location 322 and also determine relative risk level 620 of using the discount shopping application as the relative high risk 628 when the user is using the discount shopping application in the home location 320. The content module 708 can make this determination based on the privacy risk 314 associated with sharing home address information with shopping applications that may collect address information for purposes of monetizing the information.

The content module 708 can be part of the first software 226, the second software 242, or a combination thereof. The first control unit 212 can execute the first software 226, the second control unit 234 can execute the second software 242, or a combination thereof to analyze the privacy risk level 616.

Moreover, the content module 708 can also communicate the privacy risk level 616 between devices through the first communication unit 216, the second communication unit 236, or a combination thereof. After determining the privacy risk level 616, the control flow 700 can pass from the content module 708 to the history module 710.

The history module 710 is configured to retrieve one or more instances of the historical sharing profile 602. The history module 710 can retrieve one or more instances of the historical sharing profile 602 from the first storage unit 214, the second storage unit 246, or a combination thereof. Each instance of the historical sharing profile 602 can link the sharing privacy preference 644 of FIG. 6 with a particular instance of the usage context 309. As an example, the historical sharing profile 602 can link the sharing privacy preference 644 for an instance of the resource 304 with a particular instance of the device location 318 and the usage time 606.

The history module 710 is also configured to determine the sharing familiarity 612 of FIG. 6 of the sharing operation 302. The history module 710 can determine the sharing familiarity 612 by comparing the sharing operation 302 with the historical sharing profile 602 of FIG. 6. The historical sharing profile 602 can include the previous sharing operation 604 of FIG. 6 involving the first device 102, the second device 106, or a combination thereof. The history module 710 can also contribute to the historical sharing profile 602 by adding completed instances of the sharing operation 302 to the historical sharing profile 602.

The history module 710 can determine the sharing familiarity 612 by assigning the familiarity score 614 of FIG. 6 to the sharing operation 302. The history module 710 can determine the familiarity score 614 based on the first usage context 310, the second usage context 312, and the privacy risk level 616 of the resource 304.

As an example, the familiarity score 614 can range from "1" to "5." As a more specific example, the history module 710 can assign the familiarity score 614 of "5" when the device context 402, the location context 316, the user context 408, and the privacy risk level 616 of the sharing operation 302 match the device context 402, the location context 316, the user context 408, and the privacy risk level 616 of one or more instances of the previous sharing operation 604.

As an even more specific example, the history module 710 can assign the familiarity score 614 of "5" to the sharing operation 302 when both the previous sharing operation 604 and the sharing operation 302 involve the user 332 using a tablet to transfer a video file with the absolute low risk 626 to a network-enabled television at the home location 320 of FIG. 3. As another more specific example, the history module 710 can assign the familiarity score 614 of "5" to the sharing operation 302 when both the sharing operation 302 and the previous sharing operation 604 involve the user 332 using a laptop to transfer a slideshow file with the relative low risk 632 to a projector at the office location.

As another specific example, the history module 710 can assign the familiarity score 614 of "4" to the sharing operation 302 when the location context 316, the user context 408, and the privacy risk level 616 of the sharing operation 302 match the location context 316, the user context 408, and the privacy risk level 616 of the previous sharing operation 604. As an even more specific example, the sharing operation 302 can involve the user 332 transferring an image file with the absolute medium risk 624 from a mobile client device to a new laptop at the home location 320.

In this example, the history module 710 can compare the sharing operation 302 with the historical sharing profile 602 and determine the previous sharing operation 604 also involve an instance where the user 332 transferred an image file with the absolute medium risk 624 to another device at the home location 320. Based on this example, the history module 710 can assign the familiarity score 614 of "4" to the sharing operation 302.

As yet another specific example, the history module 710 can assign the familiarity score 614 of "3" to the sharing operation 302 when the location context 316 and the user context 408 of the sharing operation 302 match the location context 316 and the user context 408 of the previous sharing operation 604. As an even more specific example, the sharing operation 302 can involve the user 332 uploading a spreadsheet file with the relative high risk 628 to a personal cloud server at the work location 506. In this example, the history module 710 can determine the previous sharing operation 604 involve an instance where the user 332 uploaded a spreadsheet file with the relative medium risk 630 to the personal cloud server. Based on this example, the history module 710 can assign the familiarity score 614 of "3" to the sharing operation 302.

As a further specific example, the history module 710 can assign the familiarity score 614 of "2" to the sharing operation 302 when the location context 316 and the privacy risk level 616 of the sharing operation 302 match the location context 316 and the privacy risk level 616 of the previous sharing operation 604. As an even more specific example, the sharing operation 302 can involve a person other than the user 332 using a tablet of the user 332 to transmit a video file with the relative medium risk 630 to a network-enabled television at the home location 320. In this example, the history module 710 can determine the previous sharing operation 604 also involve multiple instances where a video file with the relative medium risk 630 was transferred to another device at the home location 320. Based on this example, the history module 710 can assign the familiarity score 614 of "2" to the sharing operation 302.

As an additional specific example, the history module 710 can assign the familiarity score 614 of "1" to the sharing operation 302 when one of the device context 402, the location context 316, or the user context 408 of the sharing operation 302 matches the device context 402, the location context 316, or the user context 408 of the previous sharing operation 604. In this example, the history module 710 can assign the familiarity score 614 of "1" to the sharing operation 302 when a device, a location, or a user involved in the sharing operation 302 was previously involved in at least one of the previous sharing operation 604.

The history module 710 can compare the sharing operation 302 with the historical sharing profile 602 using a checksum algorithm, a data matching algorithm, a hash function, a string matching algorithm, a machine learning algorithm, or a combination thereof. The history module 710 can also add completed instances of the sharing operation 302 to the historical sharing profile 602.

The history module 710 can be part of the first software 226, the second software 242, or a combination thereof. The first control unit 212 can execute the first software 226, the second control unit 234 can execute the second software 242, or a combination thereof to determine the sharing familiarity 612.

Moreover, the history module 710 can also communicate the sharing familiarity 612 between devices through the first communication unit 216, the second communication unit 236, or a combination thereof. After determining the sharing familiarity 612, the control flow 700 can pass from the history module 710 to the privacy management module 712.

The privacy management module 712 is configured to generate the permission list 634 of FIG. 6 and generate the options 324 of FIG. 3. The privacy management module 712 can generate the permission list 634 for determining which device can access the resource 304. The privacy management module 712 can generate the permission list 634 by assigning the permission level 636 of FIG. 6 to a device such as the first device 102, the second device, 106, the further device 518, or a combination thereof. The privacy management module 712 can assign the permission level 636 by taking into account the user context 408 and the resource content 426. The permission level 636 can include the full permission 638 of FIG. 6, the limited permission 640 of FIG. 6, or the null permission 642 of FIG. 6.

As an example, the privacy management module 712 can assign the permission level 636 based on the user demographic 412 of FIG. 4 and the ancillary content 434. As a more specific example, the privacy management module 712 can assign the permission level 636 based on the age 414 of the user 332 and the age restriction of the resource 304 as indicated in the ancillary content 434 including the metadata 436, the collective input 438, or a combination thereof. As an even more specific example, the resource 304 can be a video file and the user 332 can be below the age restriction indicated by the metadata 436, the collective input 438, or a combination thereof of the video file. Based on this example, the privacy management module 712 can assign the permission level 636 of the null permission 642 to a device used by the user 332 and deny access to the video file.

As another example, the privacy management module 712 can assign the permission level 636 based on the user identity 410 of FIG. 4 and the content attribute 440. As a more specific example, the privacy management module 712 can assign the permission level 636 based on data or metadata concerning a file history of the resource 304. As an even more specific example, the resource 304 can be a slideshow file and the file history of the slideshow file can indicate the user 332 at the destination 308 of the sharing operation 302 as the author of the slideshow file.

Based on this example, the privacy management module 712 can assign the permission level 636 of the full permission 638 to a device used by the user 332 such as the second device 106. In this example, the second device 106 can view, download, or make edits to the text document as a result of the full permission 638.

As an additional example, the privacy management module 712 can assign the permission level 636 based on the user context 408 and the substantive content 428. As a more specific example, the privacy management module 712 can assign the permission level 636 of the limited permission 640 when the user identity 410 such as a name of the user 332, a physical address of the user 332, or an email address of the user 332 is included in the textual content 430 of the resource 304. As another more specific example, the privacy management module 712 can assign the permission level 636 of the limited permission 640 when the pictorial content 432 of the resource 304 contains the user 332.

As an even more specific example, the sharing operation 302 can be between the first device 102 and the second device 106. In this example, the resource 304 can be a text document and the textual content 430 of the text document can include a salutation with the name of the user 332 of the second device 106. Based on this example, the privacy management module 712 can assign the permission level 636 of the limited permission 640 to the second device 106. The limited permission 640 can allow the second device 106 to view the resource 304 but not make edits to the resource 304.

As a further example, the privacy management module 712 can determine the permission level 636 based on a user input. As a more specific example, the permission level 636 can be determined by the user 332 of a device serving as the source 306 of the sharing operation 302. As an even more specific example, the sharing operation 302 can be between the first device 102 and the second device 106. In this example, the privacy management module 712 can assign the permission level 636 of the full permission 638 to the second device 106 when the user 332 of the first device 102 selects the permission level 636 from a dropdown menu or selection menu of the computing system 100. As another more specific example, the permission level 636 can be determined by a creator of the resource 304.

As an example, the privacy management module 712 can generate the permission list 634 as an access control list (ACL) such as role-based access control (RBAC) list, a discretionary access control (DAC) list, an attribute based access control (ABAC) list, or a combination thereof. As a more specific example, the privacy management module 712 can generate the permission list 634 as a network ACL on a router or a server in the communication path 104. As another more specific example, the privacy management module 712 can generate the permission list 634 as a device ACL on a device such as the first device 102, the second device 106, or a combination thereof. The privacy management module 712 can store the permission list 634 in the first storage unit 214, the second storage unit 246, or a combination thereof.

The privacy management module 712 can also generate the options 324. The privacy management module 712 can generate the options 324 for the first device 102, the second device 106, or a combination thereof. The privacy management module 712 can generate the options 324 for sharing the resource 304 with the first device 102, the second device 106, or a combination thereof based on the privacy risk level 616 and the usage context 309 including the first usage context 310, the second usage context 312, or a combination thereof.

The options 324 can include the security measure 326 of FIG. 3, the privacy recommendation 330 of FIG. 3, or a combination thereof. The privacy management module 712 can generate the options 324 based on the usage context 309 including the first usage context 310, the second usage context 312, the privacy risk level 616, the historical sharing profile 602, or a combination thereof.

The privacy management module 712 can include an enforcement module 714, a recommendation module 716, or a combination thereof. The enforcement module 714 is configured to generate the options 324 by deploying the security measure 326. The security measure 326 can include the locking procedure 442 of FIG. 4, the deactivation procedure 328 of FIG. 3, the substitution procedure 522 of FIG. 5, the encryption procedure 524 of FIG. 5, or a combination thereof.

The enforcement module 714 can deploy the security measure 326 by automatically managing the privacy risk 314 of the resource 304. The enforcement module 714 can automatically manage the privacy risk 314 of the resource 304 without an input from the user 332.

As an example, the user 332 can be watching a movie on a smartphone representing the first device 102 while returning home. When the user 332 enters her home, the content module 708 can determine the rating of the movie as "R" or intended for mature audiences. The computing system 100 can also determine the presence of other devices in the home including a tablet representing the second device 106. The context module 704 can determine the capability 403 of FIG. 4 of the tablet, including the hardware capability 404 of FIG. 4, as suitable for playing the movie. However, the context module 704 can also determine the tablet as currently being used by a 10 year old child.

The computing system 100 can also determine the tablet as having two profiles, one profile for watching children's movies and browsing children's websites and another profile for browsing general websites and watching movies without age restrictions. In this example, the content module 708 can determine the privacy risk level 616 of the movie as the relative high risk 628 based on the metadata 436 and the user context 408. Also, in this example, the privacy management module 712 can determine the permission level 636 of the child as the null permission 642 to access the movie.

Based on this example, the enforcement module 714 can deploy one or more instances of the security measure 326 to ensure the smartphone does not share the movie with the tablet. The security measure 326 can include requiring another form of authentication from the user 332 before the smartphone can share the movie with the tablet. In addition, the security measure 326 can include disabling a communication unit of the smartphone such as a WiFi or Bluetooth™ component.

Continuing with this example, the context module 704 can determine a change in the usage context 309 of the tablet later on in the evening. The context module 704 can determine a change in the device context 402 of the tablet as a late night environment based on a change in the ambient light level, the ambient noise level, or a combination thereof. Moreover, the context module 704 can determine the user identity 410 of the user 332 using the tablet as having changed from the child to an adult. Based on this example, the privacy management module 712 can share the movie with the tablet by resuming the movie from its previous location on the smartphone.

In addition, the privacy management module 712 can pass the control flow 700 back to the history module 710 to store information concerning the sharing operation 302 in the historical sharing profile 602 of the smartphone and the tablet. For example, the history module 710 can store information concerning the movie representing the resource 304, the location context 316, the device context 402, the user context 408, or a combination thereof.

As an additional example, the user 332 can be using a professional networking application such as the LinkedIn™ application on a mobile device at the work location 506. The context module 704 can determine a change in the location context 316 of the mobile device when the user 332 returns home to the home location 320. The content module 708 can determine the relative risk level 620 of the LinkedIn™ application as the relative low risk 632 at the work location 506 but rising to the relative medium risk 630 when the mobile device is at the home location 320.

Based on this example, the recommendation module 716 can recommend the user 332 disable location sharing for the LinkedIn™ application, especially pertaining to location sharing for advertisement purposes, when the mobile device is near or at the home location 320. In addition, the recommendation module 716 can recommend the user 332 hibernate the LinkedIn™ application when the user 332 is at the home location 320 and restart the application when the user 332 is back at the work location 506.

Continuing with this example, the context module 704 can determine a change in the location context 316 of the mobile device when the user 332 arrives at a shopping mall. The user 332 can install a discount shopping application on the mobile device while at the shopping mall. The content module 708 can determine the relative risk level 620 of the discount shopping application as the relative low risk 632 when the device location 318 is at the shopping mall. However, the context module 704 can determine another change in the location context 316 of the mobile device when the user 332 returns to the home location 320 from the shopping mall. At this point, the content module 708 can determine the relative risk level 620 of the discount shopping application as the relative high risk 628 when the device location 318 is the home location 320. Based on this example, the recommendation module 716 can recommend the user 332 quit or permanently uninstall the discount shopping application from the mobile device when the user 332 is at the home location 320.

As a further example, the sharing initiation module 702 can determine the commencement 608 of the sharing operation 302 between a laptop representing the first device 102 and a display device representing the second device 106 involving a slideshow file. In this example, the computing system 100 can determine the device location 318 of the first device 102 and the second device 106 as the work location 506. In addition, the content module 708 can determine the privacy risk level 616 as the absolute high risk 622 on account of the textual content 430 including numerous instances of the privacy trigger 514.

In this example, the geo-fence module 706 can generate the privacy geo-fence 516 around the second device 106. Continuing with this example, the geo-fence module 706 detect the presence of the further device 518 within the privacy geo-fence 516. The privacy management module 712 can also determine the permission level 636 of the further device 518 as the null permission 642 concerning the slideshow file. Based on this example, the enforcement module 714 can generate the options 324 by deploying the security measure 326 of the substitution procedure 522 when the further device 518 is detected within the privacy geo-fence 516 of the second device 106.

As a more specific example, the enforcement module 714 can deploy the substitution procedure 522 by inserting a substitute content in the place of the substantive content 428 of the resource 304. As an even more specific example, the enforcement module 714 can deploy the substitution procedure 522 by redacting one or more phrases in the resource 304 with redaction lines.

Also, as an example, the sharing initiation module 702 can determine the commencement 608 of the sharing operation 302 between an enterprise server representing the second device 106 and a laptop representing the first device 102 involving a text document representing the resource 304. In this example, the computing system 100 can determine the sharing operation 302 as the intra-enterprise sharing operation 502 of FIG. 5 on account of the device location 318 and the user identity 410.

Also, in this example, the content module 708 can determine the privacy risk level 616 as the absolute high risk 622 on account of the textual content 430 including numerous instances of the privacy trigger 514. Based on this example, the enforcement module 714 can generate the options 324 by deploying the security measure 326 of the encryption procedure 524. As a more specific example, the enforcement module 714 can deploy the encryption procedure 524 by using a cryptographic algorithm to obfuscate the textual content 430. The enforcement module 714 can deploy the security measure 326 in this instance of the intra-enterprise sharing operation 502 to prevent unauthorized access to the text document within the enterprise 504.

As another example, the sharing operation 302 can involve a laptop requesting access to a video file representing the resource 304 stored in a cloud storage server of a cloud storage ecosystem. Examples of the cloud storage ecosystem can include a Dropbox™ ecosystem, an One-Drive™ ecosystem, or an iCloud™ ecosystem. In this example, the context module 704 can determine the device location 318 as an unknown location and the user identity 410 as an unknown user. The history module 710 can also determine the sharing familiarity 612 of the usage context 309 as unfamiliar or having a low instance of the familiarity score 614. Also, in this example, the content module 708 can determine the privacy risk level 616 of the video file as the absolute high risk 622 on account of the resource content 426 and the ancillary content 434. Based on this example, the enforcement module 714 can require the user of the laptop to enter additional log-in credentials or deny access to the video file as part of the security measure 326.

The recommendation module 716 is configured to generate the options 324 for sharing the resource 304 with the first device 102, the second device 106, or a combination thereof by providing the privacy recommendation 330. The recommendation module 716 can provide the privacy recommendation 330 for allowing the user 332 to manage the privacy risk 314 of the resource 304.

As an example, the recommendation module 716 can generate the privacy recommendation 330 as a message window providing the user 332 at the source 306 of the sharing operation 302 with an option to deploy the security measure 326. As a more specific example, the recommendation module 716 can generate the privacy recommendation 330 as a selection menu providing the user 332 with an option to deploy the substitution procedure 522 or the encryption procedure 524.

As an example, a plurality of devices, such as the first device 102, the second device 106, the further device 518, or a combination thereof, can register with a device ecosystem provided by the computing system 100. The recommendation module 716 can generate an instance of the privacy recommendation 330 by recommending one or more devices registered with the device ecosystem as the destination 308 when the user 332 initiates the sharing operation 302 or selects the resource 304 for sharing. The recommendation module 716 can generate the privacy recommendation 330 based on the historical sharing profile 602 including the previous sharing operation 604 or a combination thereof. The recommendation module 716 can also generate the privacy recommendation 330 by recommending a new device as the destination 308 based on the historical sharing profile 602.

As another more specific example, the recommendation module 716 can generate the privacy recommendation 330 as a message window providing the user 332 with an option to deactivate a component of the first device 102 such as the first communication unit 216, the first location unit 220, the first display interface 230, or a combination thereof. As an even more specific example, the sharing initiation module 702 can determine the commencement 608 of the sharing operation 302 between a laptop representing the first device 102 and a projector representing the second device 106 involving an image file representing the resource 304.

In this example, the computing system 100 can determine the device location 318 of the first device 102 and the second device 106 as the work location 506. In addition, the content module 708 can determine the image file was generated at 11 pm on a weekend and the pictorial content 432 of the image file include the user 332. Moreover, the content module 708 can determine the privacy risk level 616 as the absolute medium risk 624. Based on this example, the recommendation module 716 can generate the options 324 by generating a confirmation screen asking the user 332 to confirm the sharing operation 302 on account of the pictorial content 432 and the device location 318.

In this example, the recommendation module 716 can generate the confirmation screen as part of the privacy recommendation 330. The recommendation module 716 can also generate the privacy recommendation 330 as a popup window providing the user 332 with suggestions for more appropriate instances of the destination 308 such as a personal cloud storage server or a photo-storage server.

Alternatively, the recommendation module 716 can generate the privacy recommendation 330 as a popup window providing the user 332 with an option to override the security measure 326 and proceed with the sharing operation 302. When the sharing operation 302 is successful, the privacy management module 712 can also record a time indicating the completion 610 of FIG. 6 of the sharing operation 302.

The privacy management module 712 can be part of the first software 226, the second software 242, or a combination thereof. The first control unit 212 can execute the first software 226, the second control unit 234 can execute the second software 242, or a combination thereof to generate the permission list 634 and generate the options 324 including deploying the security measure 326, the privacy recommendation 330, or a combination thereof. Moreover, the recommendation module 716 can also communicate the permission list 634, the security measure 326, or a combination thereof between devices through the first communication unit 216, the second communication unit 236, or a combination thereof.

Figure 8:
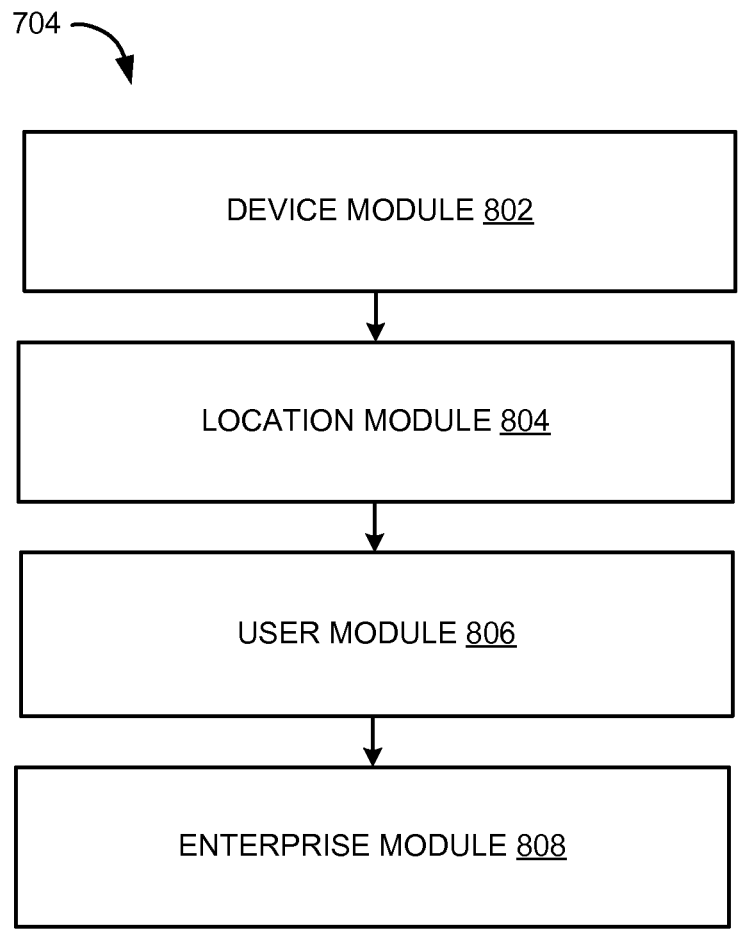
FIG. 8 is a detailed view of a portion of the control flow of the computing system.

Referring now to FIG. 8, therein is shown a detailed view of a portion of the control flow 700 of the computing system 100 of FIG. 1. The detailed view is of the context module 704 of FIG. 7. The context module 704 can include a device module 802, a location module 804, a user module 806, an enterprise module 808, or a combination thereof.

The device module 802 is configured to determine the device context 402 of FIG. 4. The device context 402 can include the capability 403 of FIG. 4 including the hardware capability 404 of FIG. 4, the software capability 406 of FIG. 4, or a combination thereof. The device module 802 can determine the device context 402 in a number of ways.

As an example, the device module 802 can determine the hardware capability 404 by identifying one or more hardware components of the first device 102 of FIG. 1, the second device 106 of FIG. 1, or a combination thereof. The device module 802 can identify the hardware components by retrieving a device identification number such as a serial number, a model number, or a part number from the first device 102, the second device 106, or a combination thereof. The device module 802 can then search for the device identification number in a device list stored in the first storage unit 214 of FIG. 2, the second storage unit 246 of FIG. 2, or a combination thereof.

The device list can include information associating the device identification number with one or more hardware components included as part of the first device 102, the second device 106, or a combination thereof. The device list can be predetermined by the computing system 100 or retrieved from a database or directory of an equipment manufacturer, a device manufacturer, or a combination thereof.

As a more specific example, the device module 802 can identify the second display interface 240 of FIG. 2 of the second device 106 as a 50 inch display screen by searching the device list for a screen size of a device associated with the device identification number.

The device module 802 can also identify the one or more hardware components of the first device 102, the second device 106, or a combination thereof by pinging the first device 102 or the second device 106 with a function call. As a more specific example, the device module 802 can identify the first communication unit 216 of FIG. 2 by pinging a WiFi component of the first communication unit 216 with a transmit functional call.

As another example, the device module 802 can determine the software capability 406 by identifying one or more software applications, operating systems, or application programming interfaces (APIs) stored in the first storage unit 214 of the first device 102, the second storage unit 246 of the second device 106, or a combination thereof. The device module 802 identify the one or more software applications by pinging the first device 102, the second device 106, or a combination thereof with an event call, an application call, or a combination thereof.

The device module 802 can also determine the software capability 406 by identifying a version of the software application or operating system. The device module 802 can identify a version of the software application or operating system by analyzing a download log or update log stored in the first storage unit 214, the second storage unit 246, or a combination thereof.

The device module 802 can also determine the device context 402 based on an environmental signal surrounding the device such as a level of ambient light or a level of ambient noise in the vicinity of the device. As an example, the device module 802 can use a light sensor of the first user interface 218 to determine the level of ambient light. In addition, the device module 802 can use an audio sensor such as a microphone to determine the level of ambient noise. The device module 802 can use the environmental signal to determine or confirm the usage time 606.

The device module 802 can be part of the first software 226 of FIG. 2, the second software 242 of FIG. 2, or a combination thereof. The first control unit 212 of FIG. 2 can execute the first software 226, the second control unit 234 of FIG. 2 can execute the second software 242, or a combination thereof to determine the device context 402.

Moreover, the device module 802 can also communicate the device context 402 between devices through the first communication unit 216, the second communication unit 236 of FIG. 2, or a combination thereof. After determining the device context 402, the control flow 700 can pass from the device module 802 to the location module 804.

The location module 804 is configured to determine the location context 316 of FIG. 3. The location module 804 can determine the location context 316 by determining the device location 318 of FIG. 3 of the first device 102, the second device 106, or a combination thereof. As an example, the location module 804 can determine the device location 318 using the first location unit 220 of FIG. 2, the second location unit 252 of FIG. 2, or a combination thereof. In addition, the location module 804 can determine the device location 318 through a multilateration (MLAT) technique or a triangulation technique using the first communication unit 216, the second communication unit 236, or a combination thereof.

As a more specific example, the location module 804 can use a GPS component of the first location unit 220 to determine the device location 318 of the first device 102. As another specific example, the location module 804 can use the second communication unit 236 to determine the device location 318 of the second device 106.

The location module 804 can determine the device location 318 as the work location 506 of FIG. 5, the home location 320 of FIG. 3, the public location 322 of FIG. 3, or a combination thereof. As an example, the location module 804 can determine the device location 318 as the work location 506 by comparing a current location of the first device 102, the second device 106, or a combination thereof with a stored instance of the work location 506.

As another example, the location module 804 can determine the device location 318 as the home location 320 by also comparing the current location of the first device 102, the second device 106, or a combination thereof with a stored instance of the home location 320. As an additional example, the location module 804 can determine the device location 318 as the public location 322 when the current location of the first device 102, the second device 106, or a combination thereof does not match either the stored instances of the home location 320 or the work location 506. As yet another example, the location module 804 can determine the device location 318 as the public location 322 based on the usage time 606 of FIG. 6 and a location information from a calendar application, an itinerary application, a scheduling application, or a combination thereof.

The location module 804 can be part of the first software 226, the second software 242, or a combination thereof. The first control unit 212 can execute the first software 226, the second control unit 234 can execute the second software 242, or a combination thereof to determine the location context 316.

Moreover, the location module 804 can also communicate the location context 316 between devices through the first communication unit 216, the second communication unit 236, or a combination thereof. After determining the location context 316, the control flow 700 can pass from the location module 804 to the user module 806.

The user module 806 is configured to determine the user context 408 of FIG. 4. The user module 806 can determine the user context 408 by determining the user identity 410 of FIG. 4, the user demographic 412 of FIG. 4, the companion identity 508 of FIG. 5, the companion demographic 512 of FIG. 5, or a combination thereof.

The user module 806 can determine the user identity 410 in a number of ways. The user module 806 can determine the user identity 410 based on the user credential 420 of FIG. 4. As an example, the user module 806 can determine the user identity 410 when the user 332 of FIG. 3 logs into or unlocks a device such as the first device 102, the second device 106, or a combination thereof with the user credential 420. As another example, the user module 806 can determine the user identity 410 when the user 332 logs into an application running on the first device 102, the second device 106, or a combination thereof.

The user module 806 can also determine the user identity 410 based on the biometric signature 422 of FIG. 4. The user module 806 can use the first biometric unit 225 of FIG. 2, the first user interface 218, the second biometric unit 256 of FIG. 2, the second user interface 238, or a combination thereof to obtain the biometric signature 422 from the user 332.

As an example, the user module 806 can determine the user identity 410 when the user 332 unlocks a device such as the first device 102, the second device 106, or a combination thereof with the biometric signature 422. As a more specific example, the user module 806 can determine the user identity 410 when the user 332 unlocks a device such as the first device 102, the second device 106, or a combination thereof by applying a fingerprint to the first biometric unit 225, the second biometric unit 256, or a combination thereof.

As another example, the user module 806 can determine the user identity 410 when the user 332 uses the first device 102, the second device 106, or a combination thereof to measure a heart rate of the user 332. As an additional example, the user module 806 can determine the user identity 410 based on a voice recognition procedure, a facial recognition procedure, or a combination thereof.

As a more specific example, the user module 806 can use a microphone component of the first user interface 218 of FIG. 2, the second user interface 238 of FIG. 2, or a combination thereof to record acoustic signals in the vicinity of the first device 102, the second device 106, or a combination thereof. The user module 806 can then confirm the acoustic signals recorded by the microphone component as the voice of the user 332 by applying a voice recognition procedure to the acoustic signals.

As another specific example, the user module 806 can use an image capture component of the first user interface 218, the second user interface 238, or a combination thereof to capture images of faces in the vicinity of the first device 102, the second device 106, or a combination thereof. The user module 806 can then confirm the face in the images as the face of the user 332 by applying a facial recognition procedure to the images.

The user module 806 can also determine the user demographic 412 based on the user identity 410 and the user profile 424 of FIG. 4. As discussed previously, the user demographic 412 can include the age 414 of FIG. 4, the gender 416 of FIG. 4, the occupation 418 of FIG. 4, or a combination thereof of the user 332. The user profile 424 can include a profile of the user 332 associated with an application, a website, an operating system, a cloud storage service, or a combination thereof. The user profile 424 can include data or information concerning the user demographic 412.

As an example, the user module 806 can determine the user demographic 412 by searching the first storage unit 214, the second storage unit 246, or a combination thereof for the user profile 424 associated with the user identity 410. As a more specific example, the user module 806 can determine the user demographic 412 by analyzing the user profile 424 of an email application used by the user 332. As another specific example, the user module 806 can determine the user demographic 412 by analyzing the user profile 424 of a social networking website accessed by the user 332 using the first device 102, the second device 106, or a combination thereof.

The user module 806 can also determine the mood 413 of FIG. 4 of the user 332 or the companion 510 of FIG. 5. The user module 806 can determine the mood 413 based on the biometric signature 422 including a heart rate, a skin temperature, a facial expression, an eye movement, or a combination thereof of the user 332 or. The computing system 100 can use the first biometric unit 225 of FIG. 2, the second biometric unit 256 of FIG. 2, or a combination thereof to determine the mood 413.

The user module 806 can also determine the companion identity 508, the companion demographic 512, or a combination thereof. As an example, the user module 806 can determine the companion identity 508 based on a device carried by the companion 510. As an example, the user module 806 can determine the companion identity 508 based on a companion credential stored in the device carried by the companion 510. In this example, the user module 806 can determine the companion identity 508 when the device carried by the companion 510 communicates with a device connected to the computing system 100 such as the first device 102, the second device 106, or a combination thereof.

As another example, the user module 806 can determine the companion identity 508 when the companion 510 logs into an application running on the first device 102, the second device 106, or a combination thereof with the companion credential. As an additional example, the user module 806 can determine the companion identity 508 based on the biometric signature 422 of the companion 510. The user module 806 can use the first biometric unit 225, the second biometric unit 256, the first user interface 218, the second user interface 238, or a combination thereof to obtain the biometric signature 422 from the companion 510.

As an example, the user module 806 can determine the companion identity 508 when the companion 510 uses the first device 102, the second device 106, or a combination thereof to measure a heart rate of the companion 510. As another example, the user module 806 can determine the companion identity 508 based on a voice recognition procedure, a facial recognition procedure, or a combination thereof.

As a more specific example, the user module 806 can analyze the acoustic signals recorded in the vicinity of the first device 102, the second device 106, or a combination thereof for one or more voices not belonging to the user 332.

As another specific example, the user module 806 can use an image capture component of the first user interface 218, the second user interface 238, or a combination thereof to capture images of faces in the vicinity of the first device 102, the second device 106, or a combination thereof. The user module 806 can then determine the companion identity 508 by applying a facial recognition mechanism to the images.

The user module 806 can also determine the companion demographic 512 based on the companion identity 508 and a companion profile. The companion profile can include a profile of the companion 510 associated with an application, a website, an operating system, a cloud storage service, or a combination thereof. The companion profile can include data or information concerning the companion demographic 512 such as the age 414, the gender 416, or the occupation 418 of the companion 510.

As an example, the user module 806 can determine the companion demographic 512 by searching the first storage unit 214, the second storage unit 246, or a combination thereof for the companion profile associated with the companion identity 508. As a more specific example, the user module 806 can determine the companion demographic 512 by analyzing the companion profile of an email application used by the companion 510 on the first device 102, the second device 106, or a combination thereof. As another specific example, the user module 806 can determine the companion demographic 512 by analyzing the companion profile of a social networking website accessed by the companion 510 using the first device 102, the second device 106, or a combination thereof.

The user module 806 can be part of the first software 226, the second software 242, or a combination thereof. The first control unit 212 can execute the first software 226, the second control unit 234 can execute the second software 242, or a combination thereof to determine the user context 408.

Moreover, the user module 806 can also communicate the user context 408 between devices through the first communication unit 216, the second communication unit 236, or a combination thereof. After determining the user context 408, the control flow 700 can pass from the user module 806 to the enterprise module 808.

The enterprise module 808 is configured to determine the sharing operation 302 of FIG. 3 as the intra-enterprise sharing operation 502 of FIG. 5. The enterprise module 808 can determine the sharing operation 302 as the intra-enterprise sharing operation 502 for managing the privacy risk 314 of FIG. 3 of the resource 304 of FIG. 3 within the enterprise 504 of FIG. 5. The enterprise module 808 can determine the sharing operation 302 as the intra-enterprise sharing operation 502 based on the location context 316, the device context 402, and the user context 408 concerning the sharing operation 302.

As an example, the sharing operation 302 can involve the first device 102 and the second device 106. In this example, the enterprise module 808 can determine the sharing operation 302 as the intra-enterprise sharing operation 502 when the device location 318 of the first device 102 and the device location 318 of the second device 106 are at geographic locations or coordinates associated with an office building of the enterprise 504. As a more specific example, the enterprise module 808 can determine the sharing operation 302 as the intra-enterprise sharing operation 502 when the device location 318 of the first device 102 is determined to be at a satellite office of the enterprise 504 and the second device 106 is determined to be at a headquarters of the enterprise 504.

As another example, the enterprise module 808 can determine the sharing operation 302 as the intra-enterprise sharing operation 502 when the first device 102 and the second device 106 are both connected to a local area network of the enterprise 504. As an additional example, the enterprise module 808 can determine the sharing operation 302 as the intra-enterprise sharing operation 502 based on the user identity 410, the user demographic 412, the user credential 420, or a combination thereof.

As a more specific example, the user module 806 can identify the user 332 of the first device 102 as an employee of the enterprise 504 based on a facial recognition procedure performed on an image of the user 332 taken at the commencement 608 of FIG. 6 of the sharing operation 302. In this example, the user module 806 can search an image directory of all employees of the enterprise 504 for an image of the user 332.

Also, in this example, the user module 806 can identify the user 332 of the second device 102 as an employee of the enterprise 504 based on a voice recognition procedure performed on a voice recording of the user 332 taken at the commencement 608 of the sharing operation 302. The user module 806 can then search an audio file directory including voice recordings from all employees of the enterprise 504 for the voice of the user 332. Based on this example, the enterprise module 808 can determine the sharing operation 302 as the intra-enterprise sharing operation 502. As an additional example, the enterprise module 808 can also determine the sharing operation 302 as the intra-enterprise sharing operation 502 when the user 332 of either the first device 102 or the second device 106 enters the user credential 420 matching a credential assigned to the user 332 by the enterprise 504.

The enterprise module 808 can be part of the first software 226, the second software 242, or a combination thereof. The first control unit 212 can execute the first software 226, the second control unit 234 can execute the second software 242, or a combination thereof to determine the sharing operation 302 as the intra-enterprise sharing operation 502. Moreover, the enterprise module 808 can also communicate the intra-enterprise sharing operation 502 through the first communication unit 216, the second communication unit 236, or a combination thereof.

It has been discovered that determining the privacy risk level 616 of FIG. 6 based on the first usage context 310 of FIG. 3, the second usage context 312 of FIG. 3, and the resource content 426 of FIG. 4 provides for a more accurate determination of the privacy risk 314 of the resource 304. As an example, an image file of the user 332 such as a digital photograph from a private album of the user 332 can pose little risk when the location context 316 is the home location 320 of the user 332 and the user context 408 is only the user 332 and close friends. However, the same instance of the image file of the user 332 can post a great amount of risk when the location context 316 is the work location 506 and the user context 408 can include work colleagues of the user 332.

It has further been discovered that determining the privacy risk level 616 based on the first usage context 310, the second usage context 312, and the resource content 426 saves the user 332 time in having to manually classify the privacy risk level 616 of numerous instances of the resource 304 stored in a storage unit such as the first storage unit 214. As an example, the computing system 100 can analyze the resource 304 for the privacy risk level 616 when another device requests access to the resource 304 or the first device 102 initiates the sharing operation 302 with the second device 106.

It has been discovered that generating the options 324 of FIG. 3 by automatically deploying the security measure 326 of FIG. 3 increases the comfort level of the user 332 when using the first device 102. As an example, the computing system 100 can deploy the deactivation procedure 328 of FIG. 3, the locking procedure 442 of FIG. 4, or a combination thereof when an authorized device without a proper instance of the permission level 636 of FIG. 6 attempts to access the resource 304. As a more specific example, the computing system 100 can deactivate a communication unit of the first device 102 such as the first communication unit 216, a location unit of the first device 102 such as the first location unit 220, or a combination thereof to safeguard the privacy risk 314 of the user 332.

It has been discovered that generating the privacy geo-fence 516 of FIG. 5 around a device such as the first device 102 provides for an improved method of safeguarding the privacy risk 314 of the user 332 in the real world. As an example, the user 332 and the companion 510 can be viewing a slideshow presentation assigned the absolute high risk 622 of FIG. 6 on a display interface of the first device 102 such as the first display interface 230. In this example, a range of the privacy geo-fence 516 can be generated based on a visible viewing ranging such as 20 meters. Based on this example, the computing system 100 can automatically deploy the security measure 326 of deactivating the first display interface 230 when another device without a proper instance of the permission level 636, such as the further device 518 of FIG. 5, is detected within the privacy geo-fence 516.

It has been discovered that generating the options 324 based on the sharing familiarity 612 of FIG. 6 as indicated in the historical sharing profile 602 of FIG. 6 provides a more personalized privacy management experience for the user 332. As an example, the computing system 100 can forgo the security measure 326 when the first usage context 310 and the second usage context 312 of the sharing operation 302 match the first usage context 310 and the second usage context 312 of one or more instances of the previous sharing operation 604 of FIG. 6. In this example, the computing system 100 can distinguish between routine device communications and anomalous events by comparing the device context 402, the location context 316, and the user context 408 of the sharing operation 302 with the previous sharing operation 604 stored as part of the historical sharing profile 602.

Figure 9:
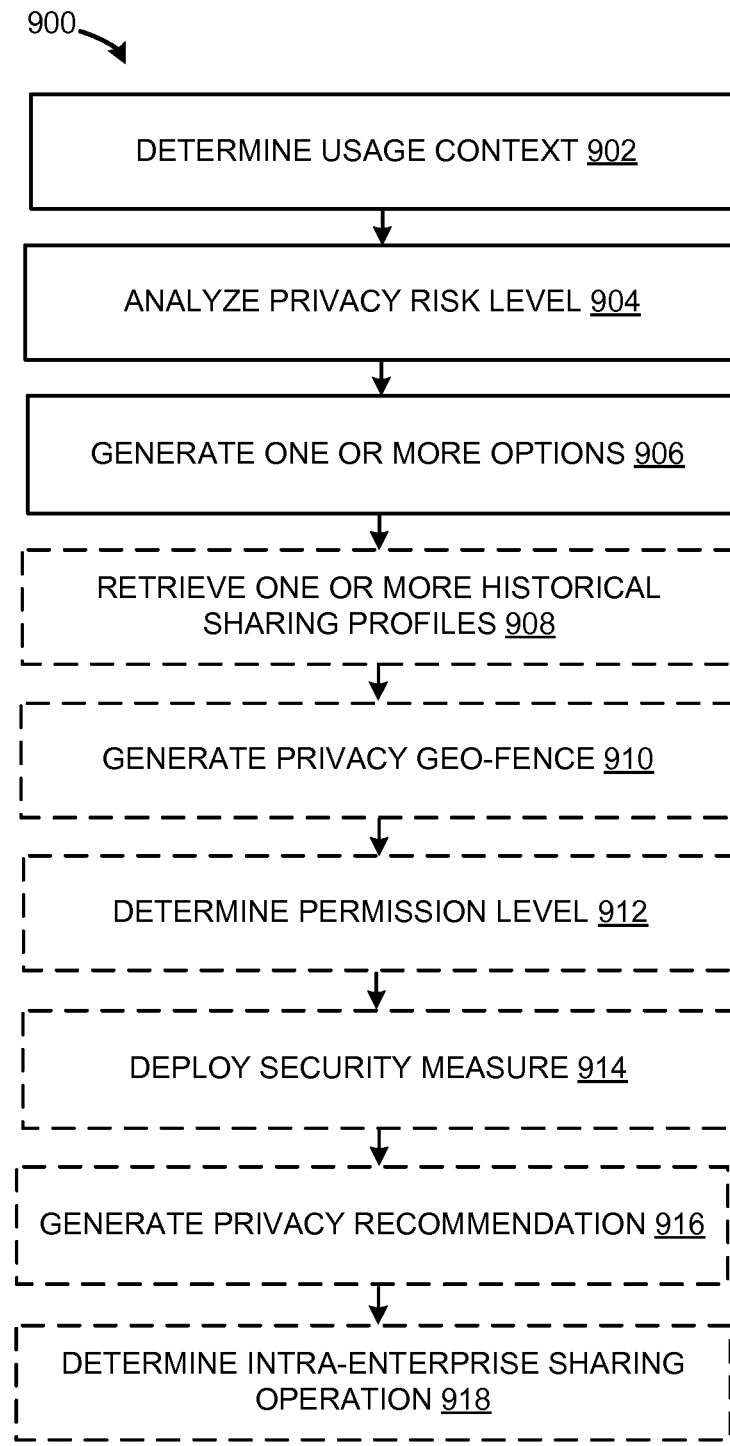
FIG. 9 is a flow chart of a method of operation of the computing system in a further embodiment of the present invention.

Referring now to FIG. 9, therein is shown an exemplary flow chart 900 of a method of operation of a computing system 100 of FIG. 1 in a further embodiment. In one example embodiment, the computing system 100 can implement the control flow 700 of FIG. 7.

The exemplary flow chart 900 can include determining, with the control unit 212 of FIG. 2, the usage context 309 of FIG. 3 including the capability 403 of FIG. 4 of a device such as the first device 102 of FIG. 1, the second device 106 of FIG. 1, or a combination thereof, the usage time 606 of FIG. 6 and the device location 318 of FIG. 3 associated with the device, and the user context 408 of FIG. 8 of one or more users 332 with access to the device in a block 902. The exemplary flow chart 900 can also include analyzing the privacy risk level 616 of FIG. 6 of the resource 304 based on the resource content 426 of FIG. 4 included in the resource 304, the metadata 436 of FIG. 4 concerning the resource 304, the collective input 438 of FIG. 4 regarding the resource 304, and the usage context 308 in a block 904.

The exemplary flow chart 900 can further include generating the one or more options 324 of FIG. 3 for sharing the resource 304 with the device based on the privacy risk level 616 and the usage context 309 in a block 906. The exemplary flow chart 900 can further include retrieving the one or more historical sharing profiles 602 of FIG. 6 of the device, wherein each of the historical sharing profiles 602 links the sharing privacy preference 644 of FIG. 6 with a particular instance of the usage context 309 in a block 908.

The exemplary flow chart 900 can further include generating the privacy geo-fence 516 of FIG. 5 around the first device 102, the second device 106, or a combination thereof in a block 910. The exemplary flow chart 900 can further include determining the permission level 636 of FIG. 6 of the further device 518 of FIG. 5 detected within the privacy geo-fence 516 for accessing the resource 304 in a block 912.

The exemplary flow chart 900 can further include generating the options 324 by deploying the security measure 326 of FIG. 3 such as the locking procedure 442 of FIG. 4, the substitution procedure 522 of FIG. 5, the encryption procedure 524 of FIG. 5, or a combination thereof in a block 914. The exemplary flow chart 900 can further include generating the options 324 for the first device 102, the second device 106, or a combination thereof by generating the privacy recommendation 330 of FIG. 3 based on the first usage context 310, the second usage context 312, and the privacy risk level 616 in a block 916. The exemplary flow chart 900 can further include determining the intra-enterprise sharing operation 502 of FIG. 5 for sharing the resource 304 within an enterprise 504 in a block 918.

The modules described herein can be hardware implementation or hardware accelerators, including passive circuitry, active circuitry, or both, in the first control unit 212 of FIG. 2, the second control unit 234 of FIG. 2, or a combination thereof. The modules can also be hardware implementation or hardware accelerators, including passive circuitry, active circuitry, or both, within the first device 102, the second device 106, or a combination thereof but outside of the first control unit 212, the second control unit 234, or a combination thereof.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 214 of FIG. 2, the second storage unit 246 of FIG. 2, or a combination thereof can represent the non-transitory computer readable medium. The first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system for privacy-aware sharing management comprising:
   a control unit, including a microprocessor, configured to:
      determine a usage context including a capability of a device, a usage time and a device location associated with the device, and a user context of one or more users with access to the device;
      analyze a privacy risk level of a resource based on a metadata concerning the resource, a collective input regarding the resource, the usage context, and identifying a privacy trigger within a substantive content included in the resource through analysis of the substantive content;
      retrieve one or more historical sharing profiles of the device, wherein each of the historical sharing profiles links a sharing privacy preference with a particular instance of the usage context;
      generate one or more options for sharing the resource with the device by generating a privacy recommendation and a security measure based on the historical sharing profile, the privacy risk level and the usage context, wherein:
         the privacy recommendation is for representing a choice or preference presented to the one or more users in one or more actions available to manage privacy risk, and
         the security measure is for representing a command or setting to implement the one or more actions to manage the privacy risk; and
   a storage unit, coupled to the control unit, configured to store the resource.

2. The system as claimed in claim 1 wherein the control unit is configured to:
   retrieve the one or more historical sharing profiles, including, a record of a previous sharing operation.

3. The system as claimed in claim 1 wherein the control unit is further configured to:
   generate a privacy geo-fence around the device;
   determine a permission level of a further device detected within the privacy geo-fence for granting access to the resource; and
   generate the one or more options for sharing the resource with the further device based on the permission level.

4. The system as claimed in claim 1 wherein the control unit is configured to generate the privacy recommendation to include a message to deploy the security measure.

5. The system as claimed in claim 1 wherein the control unit is further configured to:
   determine an intra-enterprise sharing operation for sharing the resource within an enterprise; and
   generate the one or more options for the device based on the intra-enterprise sharing operation, the privacy risk level, and the usage context.

6. The system as claimed in claim 1 wherein the control unit is further configured to determine the privacy risk level of the resource by analyzing a pictorial content of the resource.

7. The system as claimed in claim 1 wherein the control unit is further configured to generate the one or more options by deploying a locking procedure, a substitution procedure, an encryption procedure, or a combination thereof.

8. The system as claimed in claim 1 wherein the control unit is further configured to determine the user context by determining a companion identity and a companion demographic.

9. A method for privacy-aware sharing management, comprising:
   determining, with a control unit, a usage context including a capability of a device, a usage time and a device location associated with the device, and a user context of one or more users with access to the device;
   analyzing a privacy risk level of a resource based on a metadata concerning the resource, a collective input regarding the resource, the usage context, and identifying a privacy trigger within a substantive content included in the resource through analysis of the substantive content; and
   retrieving one or more historical sharing profiles of the device, wherein each of the historical sharing profiles links a sharing privacy preference with a particular instance of the usage context;
   generating one or more options for sharing the resource with the device by generating a privacy recommendation and a security measure based on the historical sharing profile, the privacy risk level and the usage context, wherein:
      the privacy recommendation is for representing a choice or preference presented to the one or more users in one or more actions available to manage privacy risk, and
      the security measure is for representing a command or setting to implement the one or more actions to manage the privacy risk.

10. The method as claimed in claim 9 wherein:
   retrieving one or more historical sharing profiles includes retrieving the one or more historical sharing profiles including a record of a previous sharing operation.

11. The method as claimed in claim 9 further comprising:
   generating a privacy geo-fence around the device;
   determining a permission level of a further device detected within the privacy geo-fence for granting access to the resource; and
   generating the one or more options for sharing the resource with the further device based on the permission level.

12. The method as claimed in claim 9 wherein generating the privacy recommendation includes generating the privacy recommendation including a message to deploy the security measure.

13. The method as claimed in claim 9 further comprising:
   determining an intra-enterprise sharing operation for sharing the resource within an enterprise; and
   generating the one or more options for the device based on the intra-enterprise sharing operation, the privacy risk level, and the usage context.

14. The method as claimed in claim 9 further comprising determining the privacy risk level of the resource by analyzing a pictorial content of the resource.

15. The method as claimed in claim 9 further comprising generating the one or more options by deploying a locking procedure, a substitution procedure, an encryption procedure, or a combination thereof.

16. The method as claimed in claim 9 further comprising determining the user context by determining a companion identity and a companion demographic.

17. A non-transitory computer readable medium including instructions for execution, comprising:
   determining a usage context including a capability of a device, a usage time and a device location associated with the device, and a user context of one or more users with access to the device;
   analyzing a privacy risk level of a resource based on a metadata concerning the resource, a collective input regarding the resource, the usage context, and identifying a privacy trigger within a substantive content included in the resource through analysis of the substantive content; and
   retrieving one or more historical sharing profiles of the device, wherein each of the historical sharing profiles links a sharing privacy preference with a particular instance of the usage context;
   generating one or more options for sharing the resource with the device by generating a privacy recommendation and a security measure based on the historical sharing profile, the privacy risk level and the usage context, wherein:
      the privacy recommendation is for representing a choice or preference presented to the one or more users in one or more actions available to manage privacy risk, and
      the security measure is for representing a command or setting to implement the one or more actions to manage the privacy risk.

18. The non-transitory computer readable medium as claimed in claim 17 wherein:
   retrieving one or more historical sharing profiles includes retrieving the one or more historical sharing profiles including a record of a previous sharing operation.

19. The non-transitory computer readable medium as claimed in claim 17 further comprising:
   generating a privacy geo-fence around the device;
   determining a permission level of a further device detected within the privacy geo-fence for granting access to the resource; and
   generating the one or more options for sharing the resource with the further device based on the permission level.

20. The non-transitory computer readable medium as claimed in claim 17 wherein generating the privacy recommendation includes generating the privavy recommendation including a message to deploy the security measure.

21. The non-transitory computer readable medium as claimed in claim 17 further comprising:
   determining an intra-enterprise sharing operation for sharing the resource within an enterprise; and generating the one or more options for the device based on the intra-enterprise sharing operation, the privacy risk level, and the usage context.

22. The non-transitory computer readable medium as claimed in claim 17 further comprising determining the privacy risk level of the resource by analyzing a pictorial content of the resource.

23. The non-transitory computer readable medium as claimed in claim 17 further comprising generating the one or more options by deploying a locking procedure, a substitution procedure, an encryption procedure, or a combination thereof.

24. The non-transitory computer readable medium as claimed in claim 17 further comprising determining the user context by determining a companion identity and a companion demographic.

* * * * *